US010883243B2

(12) United States Patent
Gregory, II

(10) Patent No.: US 10,883,243 B2
(45) Date of Patent: Jan. 5, 2021

(54) RESILIENT EROSION CONTROL APPARATUS AND INSTALLATION METHOD

(71) Applicant: Product Launch Advisors, LLC, Rock Hill, SC (US)

(72) Inventor: Richard O. Gregory, II, Rock Hill, SC (US)

(73) Assignee: Product Launch Advisors, LLC, Rock Hill, SC (US)

(*) Notice: Subject to any disclaimer, the term of this patent is extended or adjusted under 35 U.S.C. 154(b) by 0 days.

(21) Appl. No.: 16/282,414

(22) Filed: Feb. 22, 2019

(65) Prior Publication Data

US 2019/0264414 A1     Aug. 29, 2019

Related U.S. Application Data

(60) Provisional application No. 62/635,180, filed on Feb. 26, 2018.

(51) Int. Cl.
| | |
|---|---|
| *E02B 3/12* | (2006.01) |
| *E02D 17/20* | (2006.01) |
| *B01D 29/15* | (2006.01) |
| *C02F 1/00* | (2006.01) |
| *E02B 3/10* | (2006.01) |
| *C02F 103/00* | (2006.01) |

(52) U.S. Cl.
CPC ........... *E02D 17/202* (2013.01); *B01D 29/15* (2013.01); *C02F 1/004* (2013.01); *E02B 3/108* (2013.01); *E02B 3/122* (2013.01); *E02B 3/127* (2013.01); *B01D 2201/0415* (2013.01); *C02F 2103/001* (2013.01)

(58) Field of Classification Search
CPC . E02B 3/108; E02B 3/12; E02B 3/122; E02B 3/127; E02D 17/202; B01D 2201/0415
USPC .......... 210/170.03, 747.3; 405/16, 17, 302.4, 405/302.6
See application file for complete search history.

(56) References Cited

U.S. PATENT DOCUMENTS

| | | | |
|---|---|---|---|
| 4,981,392 A | 1/1991 | Taylor | |
| 6,481,928 B1* | 11/2002 | Doolaege | E02B 3/108 405/16 |
| 7,226,240 B2* | 6/2007 | Tyler | E02B 3/127 210/170.03 |
| 7,811,028 B1* | 10/2010 | de la Rosa | E02B 3/04 405/302.6 |
| 2007/0003369 A1* | 1/2007 | Hanson | E02B 3/04 405/19 |
| 2008/0131212 A1 | 6/2008 | Quinley et al. | |
| 2008/0156713 A1* | 7/2008 | Shaw | E03F 1/00 210/170.03 |

(Continued)

FOREIGN PATENT DOCUMENTS

CA     2495976     *     2/2006

*Primary Examiner* — Christopher Upton
(74) *Attorney, Agent, or Firm* — E. Eric Mills; Nexsen Pruet, PLLC

(57) ABSTRACT

An erosion control apparatus is disclosed herein comprising a filtering member defining a looped portion; a guide member positioned within the looped portion of the filtering member; and a support member insertable in the looped portion of the filtering member. The guide member facilitates insertion of the support member into the looped portion of the filtering member.

18 Claims, 18 Drawing Sheets

(56) References Cited

U.S. PATENT DOCUMENTS

2009/0266767 A1\* 10/2009 McInnis ................. E02B 3/108
  210/170.03

\* cited by examiner

RESILIENT EROSION CONTROL APPARATUS AND INSTALLATION METHOD

CROSS-REFERENCE TO RELATED APPLICATIONS

This application claims priority under 35 U.S.C. § 119 to U.S. Provisional Application No. 62/635,180, filed Feb. 26, 2018, the entirety of which is incorporated by reference herein.

FIELD

The invention is generally related to erosion control methods and devices, and, more specifically, to resilient erosion control fencing and methods thereof.

BACKGROUND

Silt fences for erosion control have been in use for many years. Once a site has been selected and prepared for silt fence installation, most high volume silt fence installers 1) use equipment to install the silt fence material typically using some sort of plow (vibratory or otherwise), 2) install t-posts every few feet for stabilization, and 3) use electrical ties or other devices to attach the silt fence to the t-posts.

Proper installation ensures that the fence is secured deep within the earth to prevent water from flowing under the fence. Additionally, the fence is tight against the t-posts preventing sagging and possible water flow over the top of the fence during a large rain event. Also, the posts must be sufficiently buried and downhill from the silt fence and the prevailing topographic incline.

At many construction sites, such as residential construction for example, an added challenge is that many work vehicles and workers are performing their work duties near the silt fence. Inadvertently, or perhaps intentionally for convenience, the silt fence on these sites is damaged during the construction project. As a result, the silt fence must be continuously reset to ensure that the erosion control function is not impaired. This usually involves resetting/re-burying the fence and setting new t-posts to repair areas where the silt fence perimeter has been compromised.

SUMMARY

A silt fence is described herein that can, in some instances, addresses damage encountered at construction sites due to high traffic and potential carelessness, and, in some cases, can provide a high speed, high efficiency installation methodology to decrease costs for erosion control companies and their clients through its speed of installation and lack of required maintenance.

In some cases, this disclosure describes method of efficient installation of a resilient silt fence in construction sites where silt fences are commonly damaged. The damage to the silt fence can, for example, occur when vehicles or crews trample and compromise the function of traditional silt fence and t-posts configurations during site construction. The resilient silt fence can in some cases solve the problem of expensive silt fence wattles that are difficult to install and maintain by offering installers a structure for silt fence that can be installed at construction sites using automated equipment. Following the installation of the filtering member around the site, a guide member can be used to pull a support member having a first shape through the filtering member where a secondary shape of the support member is assumed. This reduces the product cost in come cases by simplifying the design and the installation method. Further cost savings can be realized because follow-up checks are reduces or eliminated after installation of the resilient silt fence due to the filtering member's structure. In some embodiments, a first shape is an initial shape of the support member prior to insertion into the looped portion of the filtering member. Following insertion of the support member into the looped portion of the filtering member, the support member can assume a second shape in some instances.

In an aspect, an erosion control apparatus comprises a filtering member defining a looped portion; a guide member positioned within the looped portion of the filtering member; and a support member insertable in the looped portion of the filtering member, wherein the guide member facilitates insertion of the support member into the looped portion of the filtering member.

In some embodiments, an erosion control apparatus described herein further comprises a connecting member positioned between the support member and the guide member, the connecting member comprising attachment features connectable to the support member and the guide member.

A filtering member can be configured in some cases to permit liquid to transmit through the filtering member while substantially retaining silt and other components from the liquid. In some instances, the filtering member comprises a polyethylene or polypropylene mesh, a metal mesh, a reticulated open cell foam, a non-reticulated open cell foam, or perforated polyethylene or polypropylene plastic sheet.

In some embodiments, a looped portion is defined by a first portion of the filtering member connected to a second portion of the filtering member. The looped portion can be self-repairing in some instances, comprising excess material that compensates for any opening in the filtering member.

A support member described herein can comprise in some embodiments a first shape prior to insertion into the looped portion of the filtering member; and a second shape following insertion into the looped portion, wherein the first shape has a first cross-sectional diameter that is smaller than a second cross-sectional diameter of the second shape. The second cross-sectional diameter of the support member can be expanded relative to the first cross-sectional diameter. The support structure can in some cases resiliently deform under load and then resume the second shape once the load is removed. Moreover, in some cases the support member compresses under load and deforms to seal around the load, which reduces the flow of unfiltered liquid around the filtering member instead of through the filtering member. In some embodiments the first cross-sectional diameter is at least 50% smaller than the second cross-sectional diameter.

In some embodiments a support member described herein comprises a heat-sealed plastic sheath having a centrally located foam receiving space; and a foam positioned in the foam receiving space, wherein the sheath is impermeable to a liquid, solid, or gas present in the foam receiving space.

In other embodiments, a support member comprises an inner tube having a centrally extending receiving space; and an outer layer surrounding the inner tube. The centrally extending receiving space can be filled with at least one of a liquid or a gas. In some instances, the inner tube is impermeable to a liquid or a gas present in the centrally extending receiving space. The outer layer can include a jacket comprising a woven material in some cases. In one embodiment, the support member is a mill tube.

In some embodiments, a support member is a pole and spring device that is compressed in a first shape and expanded in a second shape.

A guide member described herein can have a length that is at least as long as the filtering member. In some embodiments, the guide member is a rope, string, cable, or wire. In another aspect, a method of installing an erosion control apparatus comprises installing a filtering member on a surface over which water is likely to flow, the filtering member defining a looped portion; pulling a guide member connected to a support member to insert the support member into the looped portion of the filtering member; and changing a shape of the support member from a first shape into a second shape, the second shape being larger than the first shape. In some embodiments, methods described herein can further comprise securing the support member to a previously installed guide member in the erosion control apparatus; and installing the support member into the looped portion of the filtering member. Furthermore, methods described herein can, in some embodiments, comprise attaching the guide member to the support member with a connecting member, which permits pulling of the guide member, support member, and connecting member through the looped portion of the filtering member.

In some instances, changing the support member shape comprises expanding the support member when the support member is substantially positioned within the looped portion.

A guide member described herein can, in some cases, be connected to the support member by a connecting member, and the connecting member can expand the looped portion of the filtering member during insertion of the support member into the looped portion.

BRIEF DESCRIPTION OF THE DRAWINGS

FIG. 2C shows a silt fence plow (220) used to install the filtering member roll (128) into the soil (222). The tail portion (102) of the filtering member (104) is inserted into the soil and the loop portion (210) of the filtering member (104) is left above the soil level. The 1 inch seam (206) of the filtering member (104) is located above the soil level. In some embodiments, the external threading member (1202) may be attached to the filtering member installation device (224) so that the support member may be installed in the looped portion of the filtering member in the same installation step as the filtering member install into the soil or other surface. When this installation method is used, the guide member (106) is not needed. This embodiment reduces the installation time and permits the entire installation with minimal labor in one step.

FIG. 3A shows a roll of support member (110) being inserted into the looped portion of the filtering member (112) using a connecting member (108) to aid insertion by connecting the guide member (106) to the support member (110). This embodiment has the guide member (106) preinstalled at the factory. Another embodiment has the guide member (106) installed into the looped portion of the filtering member (112) in the field prior to the installation of the support member. The support member (110) of the illustrated embodiment can be an open cell foam sheathed in a plastic material that is heat sealed every 8 to 10 feet with two heat seams (304). In an alternative embodiment, the support member (110) of the illustrated embodiment is a mill hose, also known as a contractor hose, comprising a rubber-like inner tube and an outer woven jacket. In embodiments using a mill hose, use of the open cell foam sheathing and heat sealed plastic material is unnecessary. A first shape (310) of the support member (110) may be smaller in volume than the second shape (312) of the support member following insertion. A guide member (106) can be used to pull the support member (110) through the looped portion in the filtering member (112). Once installed, the sheath (306) on the support member (110) may be pierced in each 8-10 foot section allowing the support member (110) to expand from its first shape to its second shape. FIG. 3B shows the filtering member (112) without the looped portion pre-made (308). The filtering member (112) may be installed in the ground or affixed to a surface and the support member (110) is rolled out next to the filtering member (112). The support member (110) may have the two seams every 8 to 10 feet (304) but the illustrated embodiment uses an initial compressed shape and a second expanded shape to increase the amount of support member installed on the roll (104) and to aid in placement of the support member inside the looped portion created after the filtering member is installed into the ground. (314) shows a method used to affix the looped portion of the filtering member (210) in order to create the looped portion where a heat seal, staple, button, rivet, or other attachment device is used to create the looped portion of the filtering member (112) and retain the support member (110).

FIG. 10A shows a construction site where 3 sides of the perimeter (1002) of a site are protected by the device. In the inside corner radii of the installation, external pathway maintaining members (1004) are depicted. FIG. 10B depicts the external pathway maintaining member (1004) composed of surfaces (1006 & 1008) used to maintain the orientation of the external pathway maintaining member to the soil and to the looped portion of the filtering member. One approach for securing the external pathway maintaining member is depicts with stakes (1010). FIG. 10C shows a plate (1120) used with t-posts and placed on the inside corner of the filtering member pathway. The plate is configured to accept t-posts (1122) and hold the t-posts in place when tension is applied to the guide member and filtering member. FIG. 10D depicts another embodiment of the external pathway maintaining member (1004) composed of two vertical walls (1124) and a horizontal member (1126) adjoined to the vertical walls which covers the filtering member once installed. Retaining features (1128) on one or both sides of the vertical walls may be used with posts to hold the member in place during the insertion of the support member when the guide member is under tension. This member may be made from 0.25" thick or greater steel to prevent deformation or failure under load. Another device resembling a step stool depicted in FIG. 10E shows one embodiment of the external pathway maintaining member (1004) with a large vertical wall which may be used on the inside corners of the filtering member pathway once the filtering member is installed in the soil. A radiused feature with either a concave (1132) or convex (1142) shape that faces the looped portion of the filtering member may be used to aid in the insertion of the support member. An arm extends over the looped portion of the filtering member (1144). A securing member may be used to hold the device in place (1146). FIG. 10F depicts an isometric view of the pathway maintaining member (1004) with concave shape (1148) or with convex shape (1150). A post or rod (1152) may be used to maintain the external pathway maintaining member's position.

FIG. 17A shows a side view of the connecting member. Two conical shapes (1706 & 1708) are joined with a collar (1710) which houses bearing shafts (1702) and wheels (1704). The wheels may be mounted on rigid or semi-rigid bearing shafts to permit movement when the connecting member is moving inside the looped portion of the filter member. The leading surface (1706) has a smaller hole for the guide member (106) if needed in some embodiments. The trailing surface (1708) is used in some embodiments with the external threading apparatus (1202) to push the connecting member (108) and support member (110) through the looped portion of the filtering member. The hole (1712) in the trailing surface in some embodiments is larger than the first shape of the support member (110) to facilitate insertion into the looped portion of the filtering member (112). In some embodiments, features for magnetic connection (1714) to the external threading apparatus may be used. FIG. 17B shows a front view of one embodiment of the connecting member with the leading surface (1706) and the guide member (106). Depicted in this embodiment are four bearing shafts (1702) and four wheels (1704). FIG. 17C illustrates one embodiment of the external threading member (1202) and the connecting member (108). The external threading member (1202) is smaller in diameter than the trailing surface (1708) in this embodiment. In some embodiments, because of the smaller diameter of external threading apparatus relative to the diameter of the connecting member, this facilitates movement of the connecting member through the loop portion of the filtering member.

DETAILED DESCRIPTION

Figure 1:
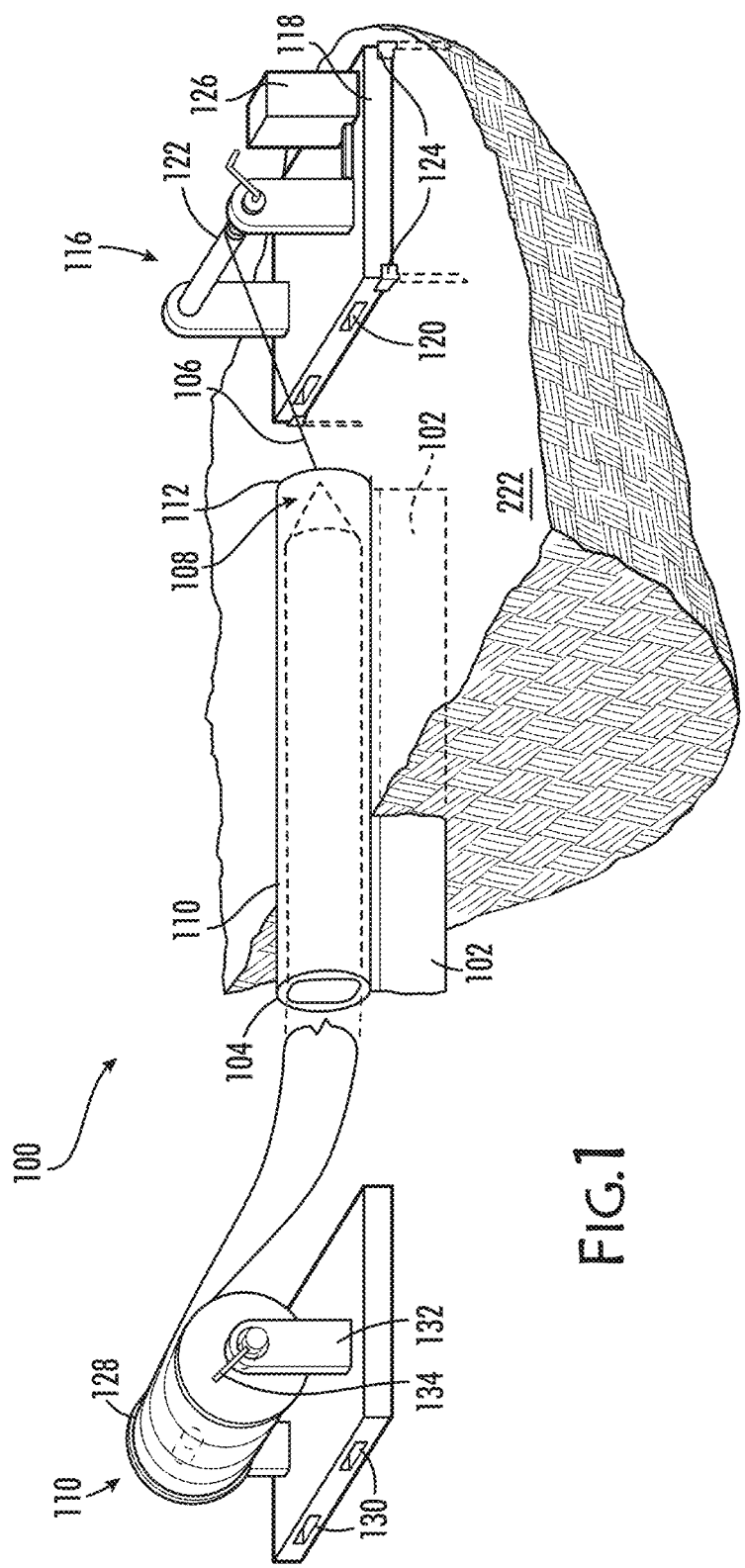
FIG. 1 depicts the erosion control apparatus (100) with the tail portion (102) of the filtering member (104) shown inserted into the ground. The filtering member permits liquid to pass through and does not permit solids such as silt from passing through. The tail portion of the filtering member may be inserted into the soil or attached to rigid surfaces such as asphalt or concrete using mechanical anchors and lumber or other attaching devices. Inside the looped portion of the filtering member, the guide member (106) is seen on the right attached to the connecting member (108). The connecting member (108) attaches the guide member to the support member (110) in some embodiments. In other embodiments, the connecting member (108) is not required. When the connecting member is used, it expands the looped portion (112) of the filtering member since it is semi-rigid and made from a lubricious material. In other embodiments, the connecting member is threaded through the looped portion of the filtering member by applying pressure from outside the looped portion of the filtering member on the connecting member. A pallet winch (116) with a rigid member (118) possessing features (120) for pallet forks is shown holding a winch member (122) used to wind up the guide member. The pallet winch also has attaching members (124) to anchor the pallet to the ground during use. A power member (126) provides power to the pallet winch in order to wind and unwind the guide member. A roll of support material (128) is also depicted in a horizontal configuration. The roll member (128) also has features (130) for pallet forks. The roll member (132) holds the roll of support member (110) and has a feature permitting the roll to be rolled or unrolled using a locking mechanism (134). The roll member may contain support member (110) of an original shape and size or of a second shape and size.

Embodiments described herein can be understood more readily by reference to the following detailed description and examples. Elements, apparatus, and methods described herein, however, are not limited to the specific embodiments presented in the detailed description and examples. It should be recognized that these embodiments are merely illustrative of the principles of this disclosure. Numerous modifications and adaptations will be readily apparent to those of skill in the art without departing from the spirit and scope of this disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, such as 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

The following disclosure describes methods and devices that can provide one or more advantages relative to conventional approaches used for erosion control. One such conventional approach by Filtrexx, Silt Soxx, involves compost filter socks made from polymeric shell materials where the sock was filled with a variety of materials which served to impede the water, filter the silt, and/or capture potentially harmful components from leaving the construction site. The problem with these solutions are that the socks are extremely heavy and the filler material is expensive to use and difficult to insert into the sock. Prefilled socks were also available from this source, but due to the weight they are not economically competitive from a shipping and handling perspective. Install labor not only includes laying the sock in place, but also staking the sock to prevent movement during rain events.

Another product called Durawattle, by WTB Inc., has also been developed and is disclosed in US Patent Publication 2008/0131212. As the name implies, the wattle is similar to the straw wattles used to reduce water runoff velocity in drainage areas. These wattles are not filled with organic material. Instead, they come pre-filled with a compressed, open cell foam inside a plastic sheath. An outer sheath serves to protect the foam and to filter silt from runoff. The pre-made wattles are each 8-10 feet in length and can be nested into one another in order to make a longer wattle. They contain a "tail" section which can be secured to the earth or other surface (such as asphalt or concrete) to ensure that the wattle remains in place. Once installed along a construction site perimeter or construction entrance, the plastic sheath inside the wattle is pierced and the foam expands to fill the loop made in the wattle. This product has two main differences: 1) the outer sheath filters water allowing it to flow through the wattle preventing the silt from leaving the construction site and 2) the inner core that fills the wattle is compressible which permits work vehicles and equipment to crush the wattle, and once removed, the wattle resumes its prior shape used to filter the silt. The field and lab test results show that this wattle is not only an excellent filtration medium for silt removal but also the wattle can withstand numerous "crush events" such as vehicle traffic over years of expected life. As a result, these wattles address a key concern that many silt fence installers for residential construction sites have, namely, that they will not have to repeatedly inspect and repair previously installed product. The barrier to large scale adoption of these wattles, however, is the total cost of use including product cost, shipping cost, and installation labor cost.

An erosion control apparatus described herein (100) can comprise an ecosystem of apparatuses and installation methods to reduce all the aforementioned costs and ease automated installation. In some embodiments, an easy to install erosion control apparatus (100) comprises a filtering member (104) and defining a looped portion (112); a guide member (106) positioned within the looped portion of the filtering member; a support member (110) adapted for insertion within the looped portion of the filtering member, and, when needed, an external threading member (1202) which facilitates insertion of the support member into the looped portion of the filtering member. A connecting member (108) can be placed between the guide member and the support member and is used to attach the guide member to the support member and can be used to insert the support member into the looped portion of the filtering member. The connecting member can be semi-rigid such that under small compressive forces the connecting member will not deform but under larger compressive forces the connecting member will deform. The connecting member can be lubricious to help insert the connecting member through the looped portion of the filtering member.

The filtering member (104) of certain embodiments of an erosion control apparatus described herein is composed of a UV resistant, polymer material with a tensile strength of at least 200 pounds-force. The filtering member polymer possesses an effective flow rate of at least 4 gallons per square foot per minute. The filtering member opening is equivalent to at least 0.0278 inches square and no smaller than 0.0083 inches square. This is equivalent to a US Sieve range from #70 to #20 or a Tyler Equivalent of 65 Mesh to 20 Mesh respectively. The opening size controls the water flow rate as well as silt and particulate filtration. If the opening size is too small, the water flow rate will be too low and the erosion control apparatus will be overrun during rain events. If the opening size is too large, the flow rate will be sufficient, however, the filtering member will not retain silt and other particulates allowing them to be released from the site and thus fail in their function to prevent erosion. Cuts, slits, or other impairments to the filtration properties of the filtering member should be repaired prior to use in order to ensure proper function of the erosion control device (602).

The filtering member (104) is flexible since it may be crushed or driven over in high traffic areas. A polymer such as polypropylene or a blend of polymers offering good flexibility, high tensile strength, excellent filtration, and the ability to sew the material and retain the looped portion of the filtering member is very beneficial. The filtering member should be at least 36 inches wide prior to manufacturing. This width permits the non-looped portion, referred to as the tail portion (102), to be between 12 and 14 inches long. This tail length ensures that the material may be either installed sufficiently deep within the soil or fastened to the ground using a rigid member such as lumber or other attaching devices which may be secured to rigid surfaces such as asphalt or concrete. The remaining width of the filtering member will have the guide member inserted within the looped portion (112) created by folding over the 22-24 inches of remaining filtering member. The looped portion may be created prior to delivery at the installation site or on-site. It is beneficial to note that in some embodiments, the looped portion does not have to be a completely enclosed loop. In some embodiments, the looped portion encloses just enough to keep the support member within the looped portion of the filtering member.

The filtering member is sown to itself in an approximately 1 inch wide swath (214) where one swath is located approximately 13 to 15 inches from the tail. The other half of the 1 inch swath is between 35 and 36 inches from the tail (102). If the swath is larger than 1 inch for the stitch pattern location, then the opening may be too small for inserting the support member. The stitch patterns (214) which are best for this application are the overlook stitch, the zigzag stitch, or the 3 step zigzag stitch. Embodiments include other methods of attachment in the aforementioned swath including heat sealing the filtering member looped portion or the use of adhesives such as pressure sensitive tapes or mechanical fasteners such as rivets or hooks and loops.

The length of the filtering member is as long as possible to reduce the amount of splicing required between rolls of filtering member (128). However, the filtering member rolls of extreme length become heavy and are difficult for personnel to manipulate and equipment to install. It is desired in some embodiments, to use a roll of material that is at least 250 feet long. The filtering member with the guide member installed (106) in the looped portion (210) can be rolled onto a cardboard (216) or equivalent tube with at least a 1.5 inch inside diameter so that the roll is loaded onto commonly used installation equipment. The cardboard tube in some embodiments is at least 30 inches long and preferably 36 to 40 inches in length. A company name can be printed on the looped portion of the filtering member since the tail portion may not be visible. If a name is included, it can be printed on both sides of the looped portion with the bottom of the company name facing toward the tail on both sides of the looped portion. The printed information can be approximately 5 inches in height per side depending on the final dimensions and shape of the support member.

The guide member (106) in certain embodiments must be located inside the looped portion of the filtering member. Another embodiment permits the guide member to be installed after the filtering member is located at the construction site. In some embodiments, the guide member can be at least 2 feet longer per end than the filtering member length. Multiple pieces of the guide member are can be joined together. The number of segments of the guide member are minimized since these connection points increase pull friction through the looped portion of the filtering member and more segments increase the likelihood that the guide member may catch and become detached making it difficult to reinsert the guide member into the looped portion of the filtering member.

The guide member (106) can be rope using synthetic fibers although natural fibers or metal wire are also permissible. Both braided or twisted strands are acceptable. The rope or wire should be low cost, low friction, easy to attach and tie, and of a sufficient length as previously mentioned. The rope will be used in tension and this is why braided rope more evenly distributes the tensile load among all the strands. The working tensile load of the rope can be between 200 and 1000 pounds depending on the roll length. In some embodiments, ¼" diameter polypropylene rope from a tension standpoint is sufficient and may be joined to other segments using mechanical devices such as clamps and a thimble or a knot such as the Fishermen's Knot or the Water Knot where two ends are joined together.

The rope used as a guide member can be located inside the looped portion of the filtering member (112) so that when the guide member is connected to the connecting member (108) or the support member and rope can be pulled from the starting end to the other end of the desired length of the erosion control apparatus. Rough edges, such as those encountered with a wire guide member, should be avoided or mitigated by covering the rough edges so that excessive friction or catching of the rough edges inside the looped portion of the filtering member does not occur. Placing a loop in both ends of the guide member either by tying a loop knot such as a Bowline knot or other knot or using a mechanical clamp and thimble help with attaching a guide member to either another guide member from another roll of the filtering member (128) or attaching a guide member to the connecting member or directly to the support member.

Notably, the guide member loop knot should have little to no slip, because this makes installation difficult. In some embodiments, the connecting member is omitted and the guide member is directly attached to the support member using a knot such as the Running Bowline knot. This type of knot in the guide member will progressively tighten around the support member as more tension is applied ensuring that the support member is firmly attached to the guide member which can be beneficial on long pathways.

A support member adapted for insertion may have several structures. One embodiment is for the support member to be composed of an outer sheath of UV resistant black, polypropylene plastic which is at least 3 mil thick (306). 5 mil polypropylene sheet has higher tensile strength and protects the foam inside the support member sheath. The sheath can be a flat plastic mat which is folded over a non-reticulated open cell polyurethane foam and heat sealed the length of the plastic sheath piece as well as heat sealed at each end of the foam approximately 2-3 inches past the end of the foam. This distance helps to ensure that not too much stress is placed on the heat sealed joint. Joint seals (304) at the ends should be complete, air-tight, and spaced at least 1 inch from one another at both ends of each foam segment length so that the support member can be terminated at these locations.

The plastic sheath of the support member (306) can also be a pre-formed tube of polypropylene plastic so that only the ends of the sheath must be heat sealed. Two heat seals at each end of this tube is required. The plastic sheet configuration depends on the supplier and which method is lowest cost to produce. If a longitudinal heat seam is used, care must be taken to ensure that the seam along the length of the support member is air-tight. The same air-tight double seal (304) described previously is required for the seams at the ends of the plastic sheath.

The foam inside the support member (402) can be selected based on the optimal length for the foam supplier to minimize cost. Most suppliers can provide foam buns that are approximately 8 to 10 feet in length. Low density foam in the range of 10-20 pounds per cubic foot is used in some embodiments because this density is low cost and the open cells allow the foam to be easily compressed into their first shape for sheath and filtering member loop insertion. The UV resistance in the foam of the support member may not be necessary when the polypropylene plastic sheet is opaque.

Some producers are able to make the support member sheath (306) with perforations between the 8-10 foot lengths, but this is not recommended since the perforations are opportunities for the plastic material of the support member to fail in tension during insertion. When separation does occur, the two support members must be reconnected to one another inside the looped portion of the filtering member by slitting the loop, joining the support members with rope, wire, tape, rivets, or other fasteners such as adhesives and patching the slit in the looped portion.

One embodiment for joining the support members to one another is to use a piece of the guide member (106) with the Running Bowline knot in either end of the guide member to tighten around the support members. The length of the guide member connected to support members can be minimized and create a gap in the support member no longer than 1 foot to ensure that the filtering member maintains its shape once the support member is inserted and assumes its second shape.

Another consideration in joining the support member (110) segments is that the plastic sheath surrounding the foam must not be compromised so that the first shape is different from the second shape. The initial cross section of the foam prior to covering with the plastic sheath and prior to compression is a 4 inch wide by 6 inch tall rectangle. Cross sectional profiles as small as a 4 inch by 4 inch square are sufficient and lowest cost, however, the rectangular profile with the height as the largest dimension is preferred in some embodiments since this ensures that the filtering member looped portion is as tall as possible once the support member assumes its second shape. Cross sectional profiles as large as 6 inch by 6 inch are possible but the larger the area of foam, the more expensive the materials cost and the more difficult it is to pull the support member through the looped portion of the filtering member.

When the foam is sheathed (402) and prior to it being heat sealed at the ends, the foam and sheath may be compressed (802) in some embodiments to be heat sealed. This compression and sealing process reduces the insertion shape and force required for insertion. However, if the foam is too stiff or compressed too much, then the support member first shape will be rigid and difficult to insert into the filtering member using the guide member. In some embodiments, the compression of the foam in the support member inside the sheath may be compressed at least 50% its original volume. The compression ratio maximizes the length of support member available on a roll. This reduces labor and shipping costs due to increased product length per roll. When the heat seal seam or sheath is compromised in terms of its vacuum, the foam inside the support member sheath will expand and make insertion into the filtering member difficult. If this does occur, it is advised to remove the 8-10 foot section of the support member that has assumed its second shape and reconnect the support member segments that are still in their first shape as mentioned previously.

Figure 4:
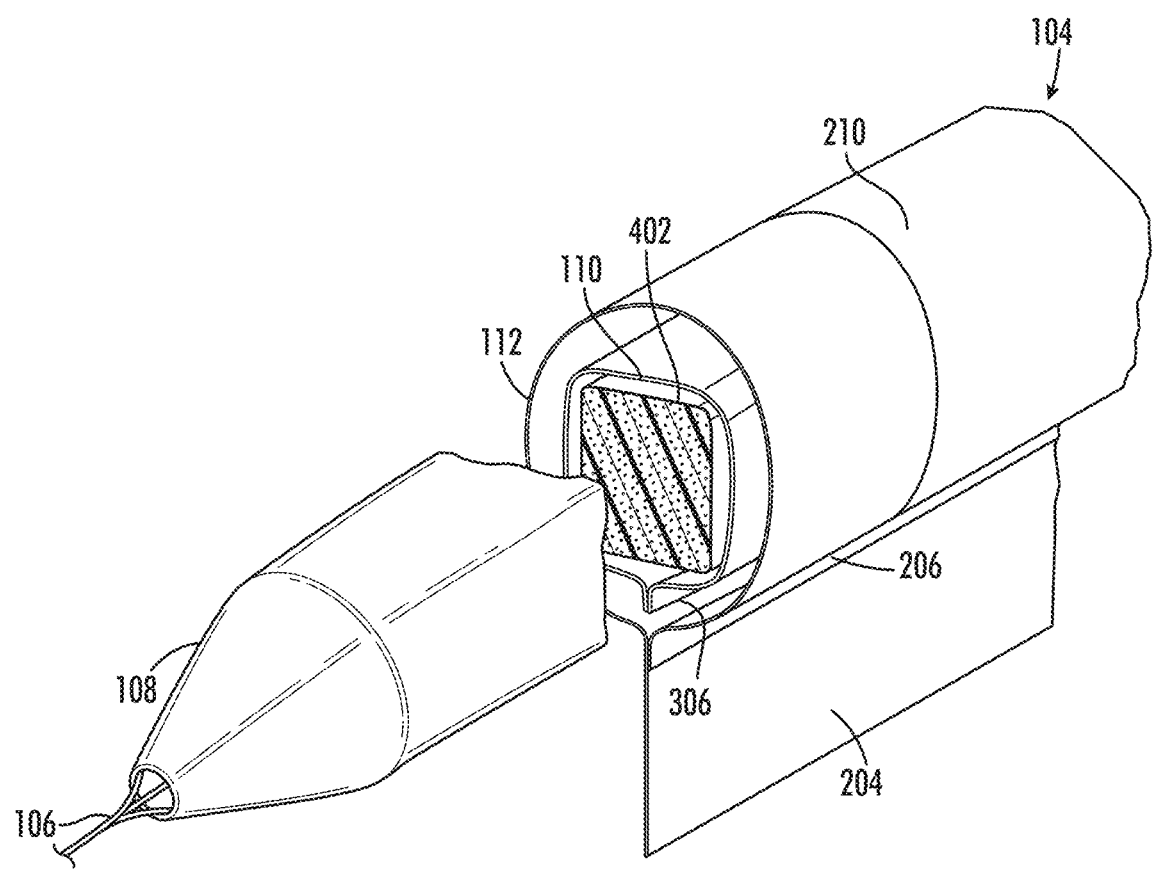
FIG. 4 shows a further embodiment of the apparatus and method of the invention. In the illustrated embodiment, the guide member (106) is inserted into the filtering member (104) and the looped portion (112) with the guide member therein. The connecting member (108) is shown between the guide member (106) and the support member (110). This figure depicts a cross sectional cut-away view of the apparatus with the tail (204) inserted into the soil, the looped portion where the end of the looped portion is affixed to the filtering member. The affixed portion (206) may be attached to the filtering member using any attachment device including, but not limited to, heat sealing, adhesives, rivets, buttons, hook and loops, screws, staples, or magnets. The support member (110) sheath (306) is depicted within the looped portion of the filtering member. A cut-away view shows the foam (402) within the plastic sheath (306) of the support member.
Figure 7:
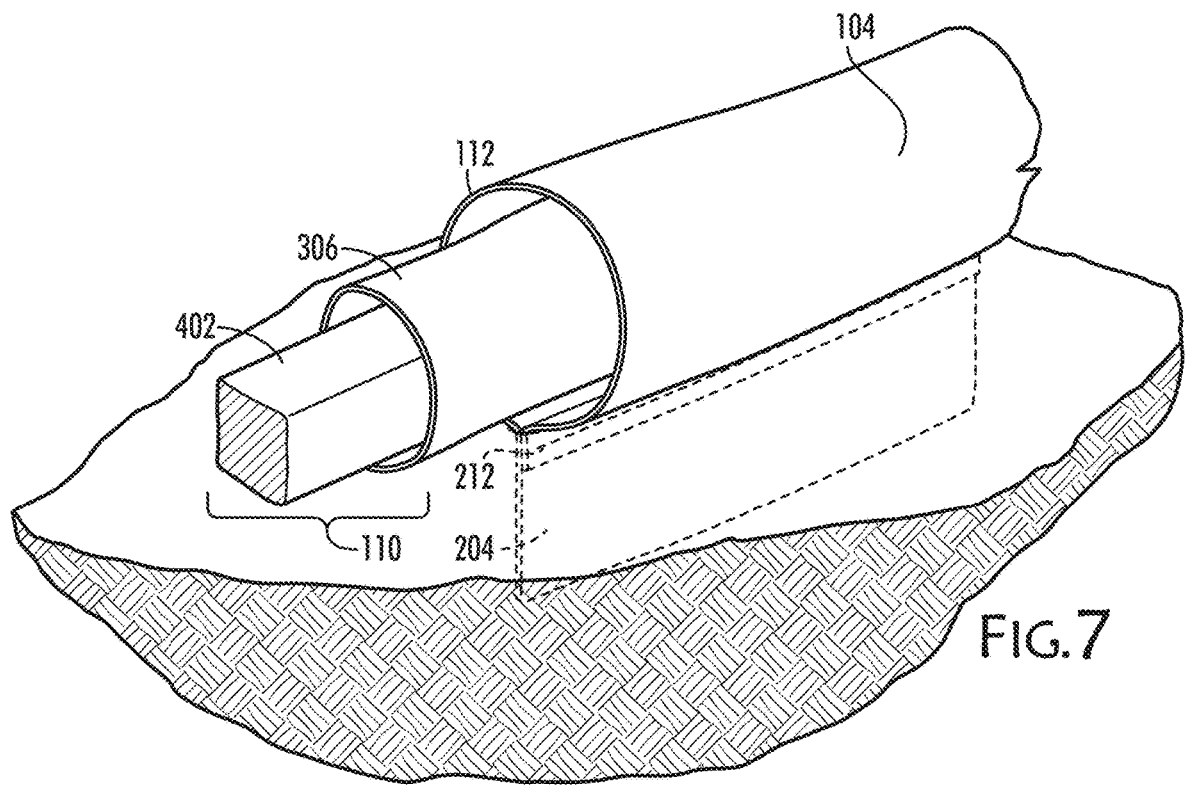
FIG. 7 depicts a plastic sheath (306) around a foam (402) defining the support member (110). The support member (110) is shown inside the looped portion (112) of the filtering member (104) contained therein. A 1" seam (212) is depicted with stitches demonstrating how the looped portion is maintained. The tail portion (204) of the filtering member may be inserted into the soil or attached to a surface.
Figure 8:
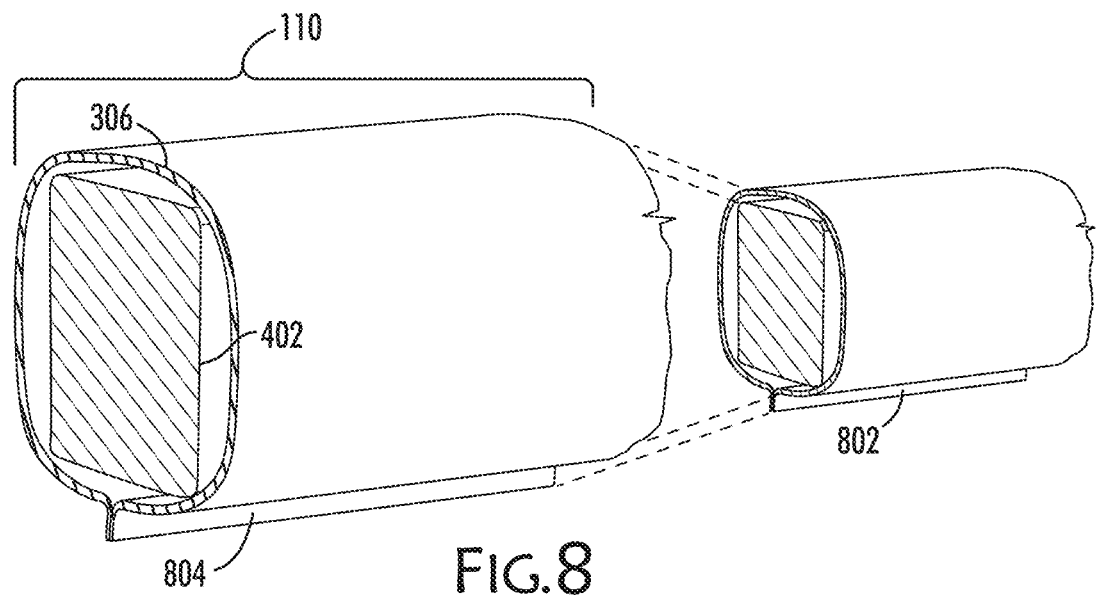
FIG. 8 depicts a cross section view of the support member (110). In this embodiment, a heat seam seal is shown surrounding the support member foam within. The plastic sheath may be composed of a low cost, durable plastic material that may be heat sealed. In other embodiments, the foam (402) may be surrounded by a tube of plastic sheath (306) material eliminating the heat seal along the length of the support member. The foam (402) may be compressed into a first shape (802) of smaller volume than the second shape (804).

In some embodiments, a support member (402) disclosed herein comprises a mill hose rather than foam covered in an outer plastic sheet as described for example in FIGS. 4, 7, and 8. In these embodiments, a mill hose comprises a rubber-like inner tube covered in an outer layer comprising a woven jacket. A mill hose described herein can also be called or known as a contractor hose or a fireman hose.

While FIGS. 4, 7, and 8 show the support member having a foam (402) covered/surrounded by an outer plastic sheeting (306), the mill hose embodiments can similarly be represented by the same figures. For example, while FIG. 7 shows an exemplary open cell foam (402), reference (402) can, in some embodiments using a mill hose-based support member, depict an air receiving space extending through a length of the mill hose. The air receiving space (402) can be defined by the inner tube of the mill hose, and extend along a length thereof. The inner tube of the mill hose can be made from any material suitable for holding pressurized air in the air receiving space (402), such as a natural or synthetic rubber, a plastic, and the like.

The outer sheeting (306) shown in FIGS. 4, 7, and 8 can similarly represent an outer layer of a mill hose comprising a woven jacket. The woven jacket can be made from any material not inconsistent with the objectives of this disclosure. For example, in some instances, the jacket can be woven from cotton, a polyester, a polyacrylate, and the like.

In these embodiments, opposing ends of the mill hose-based support member can be sealed, and the air receiving space (402) pressurized with air. For example, air can be introduced into the air receiving space (402) using an air compressor, and the air receiving space (402) can be inflated to any desirable pressure, such as 5 psi, 10 psi, 15 psi, 20 psi, or more than 20 psi, generally after the mill hose has been inserted in the loop (as described in detail herein).

In some instances, use of a mill hose as a support member can offer one or more advantages over other support members, such as the foam and plastic sheet embodiments described herein. For example, mill hoses can be manufactured in almost any length, eliminating a need to join a number of smaller segments of the foam and plastic sheet embodiments together. Additionally, when the erosion control apparatus is no longer needed, the mill hose can be deflated, removed, rolled up, and reused, rather than being discarded. Furthermore, the mill hose also can be resiliently compressed due to the relatively low inflation pressures, so that vehicles can drive over the erosion control apparatus without damaging it.

A support member described herein, such as the foam and plastic sheet or the mill hose embodiments, can have any cross-sectional shape not inconsistent with the objectives of this disclosure. For example, in some embodiments, such as is shown in FIGS. 7 and 8, a support member can have a square cross-sectional shape. However, in other embodiments, a support member can have a circular, oval, rectangular, triangular, pentagonal, hexagonal, or high level polygonal shape.

Figure 5:
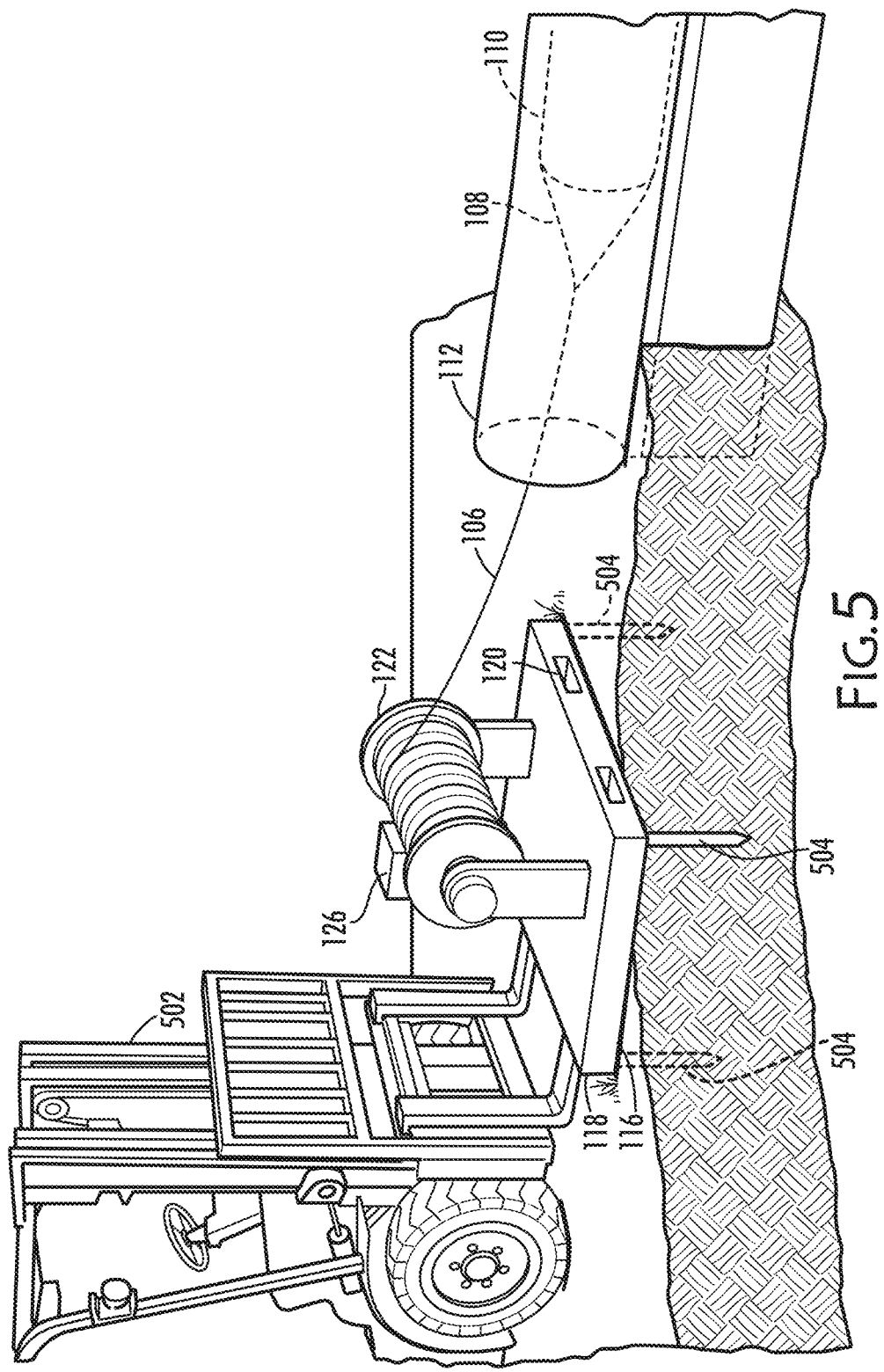
FIG. 5 shows a skid steer (502) used to move a winch pallet (116) into location at the end of a portion of the erosion control apparatus to be installed. The winch pallet has stakes (504) to secure the pallet to the soil so that the skid steer is not needed. The winch (122) is used to pull the guide member (106) through the looped portion of the filtering member (112) by connecting the guide member (106) to a connecting member (108). The connecting member (108) attaches the guide member (106) to the support member (110). The connecting member (108) also expands the looped portion of the filtering member (112) to reduce the pull force required for support member (110) insertion.
Figure 6:
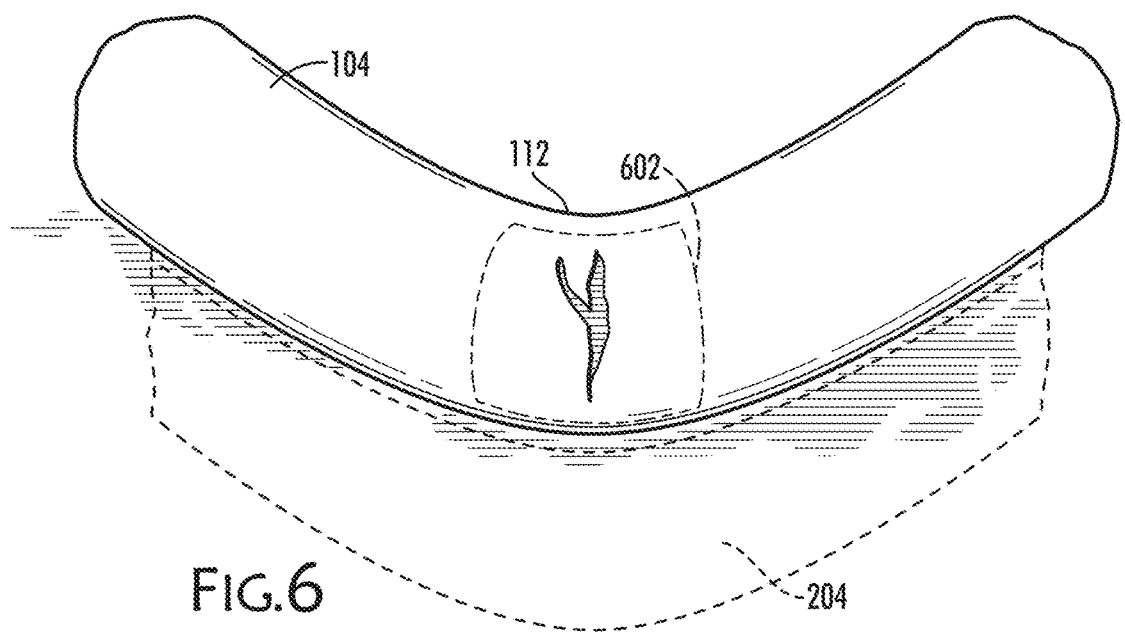
FIG. 6 shows a portion of the installed erosion control apparatus pathway. In this Figure, tail portion (204) of the filtering member (104) is shown inserted into the soil. A patch (602) is depicted which may be used to cover a hole, slit, or cut made in the filtering member (104). In this figure, the patch is placed inside the looped portion of the filtering member (112). However, in some embodiments, the patch may be affixed to the outside of the looped portion in order to protect the support member within.
Figure 9:
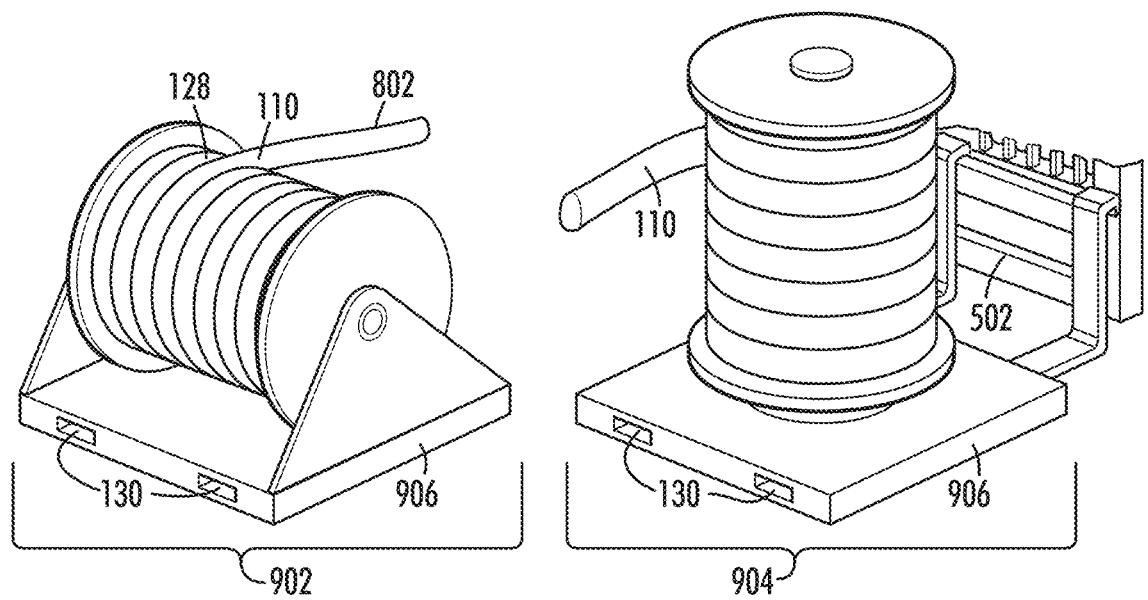
FIG. 9 shows two configurations for the structure of the horizontal pallet roll apparatus (902) and the vertical pallet roll apparatus (904). In one embodiment of the horizontal pallet roll apparatus (902), a pallet (906) can be easily moved and manipulated by a skid steer (502) at the construction site using slots (130) in the pallet for forks. The support member (110) can be stored on a pallet roll apparatus from the factory. The support member may be structured in a first shape (802) on the pallet roll and after insertion into the looped portion of the filtering member may assume a second shape of larger volume. This first shape being smaller in volume permits increased shipping density to save on physical space and cost. The first shape, since smaller in volume, is easier to insert into the looped portion of the filtering member. Another embodiment is structured with a vertical roll of the support member (904) in a first shape for similar reasons. In both configurations, the pallet roll apparatus is placed at the point where the installer wishes to insert the support member into the looped portion of the filtering member.
Figure 10A:
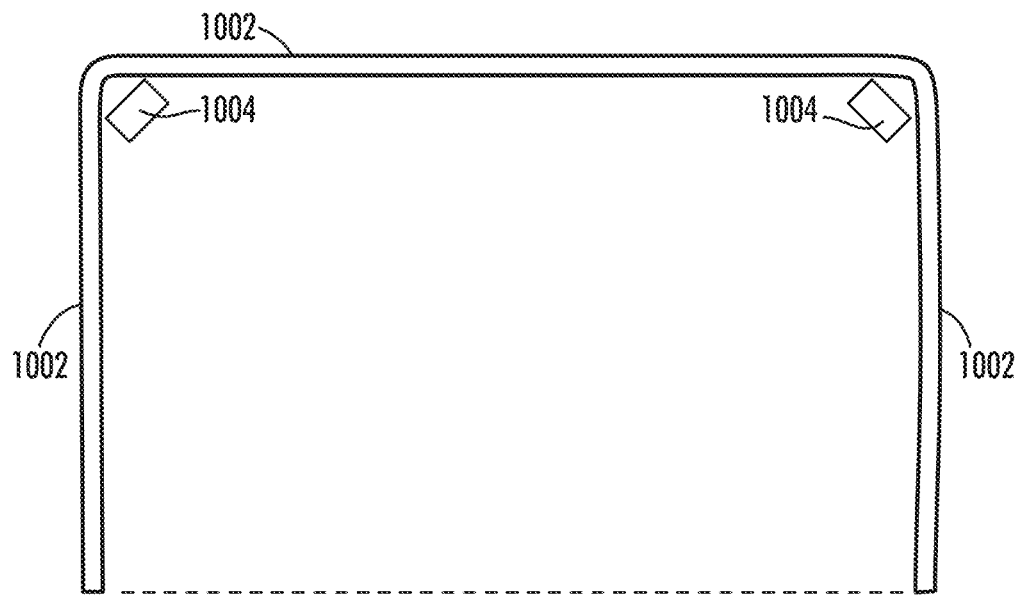
FIGS. 10A-F depict structures used to help install the silt fence apparatus (100) as well as an overall view of a shape of the installed device.
Figure 10B:
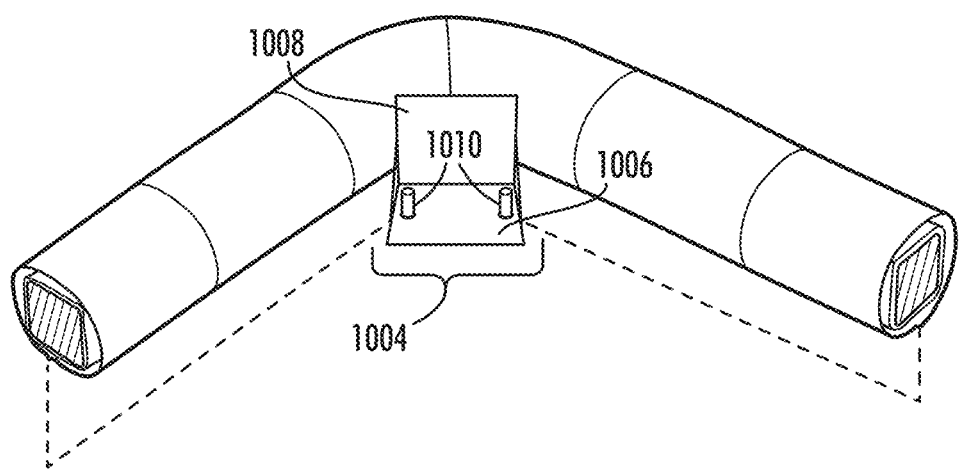
Figure 10C:
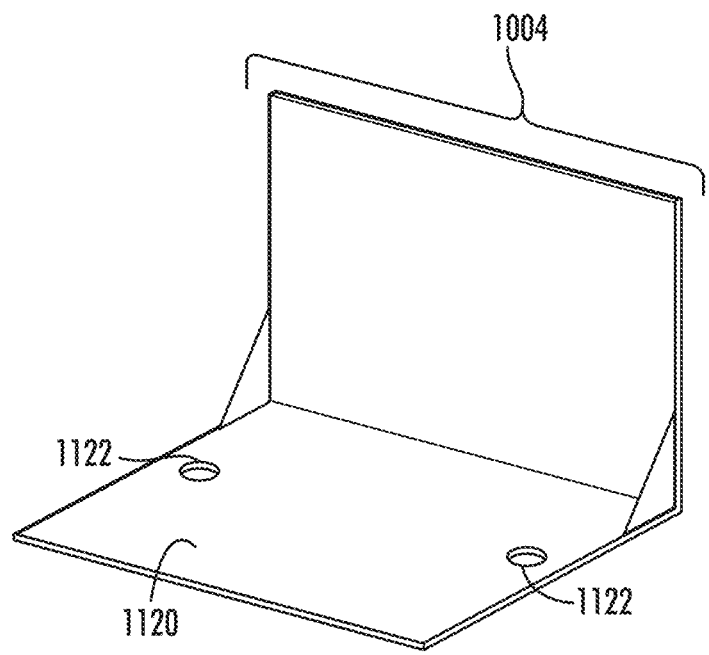
Figure 10D:
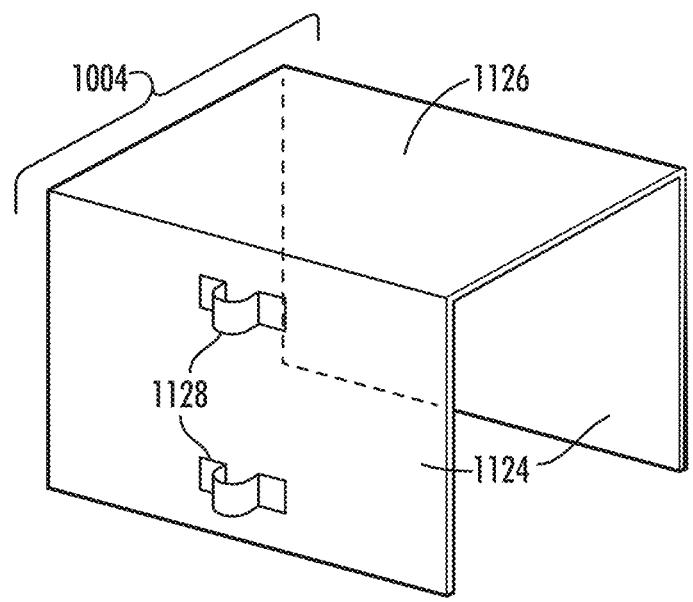
Figure 10E:
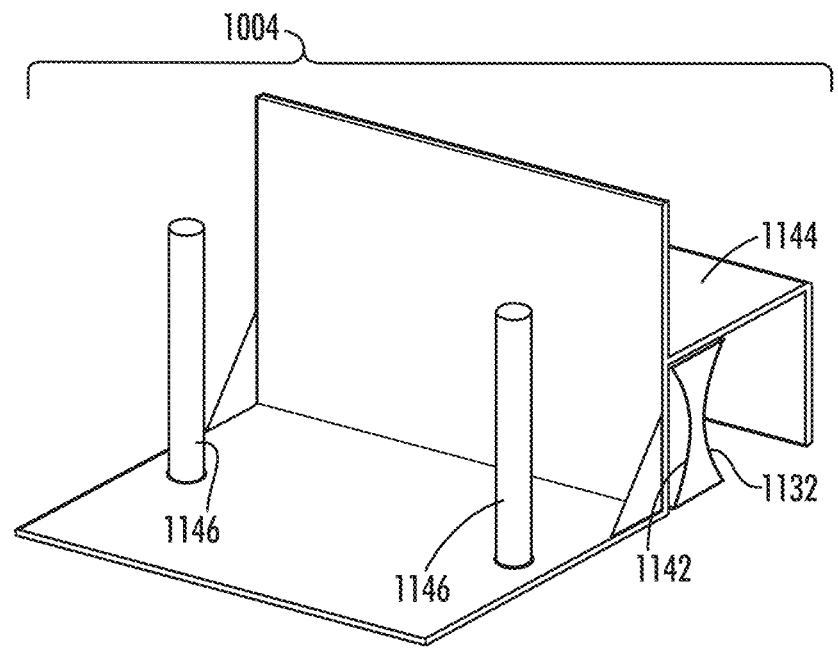
Figure 10F:
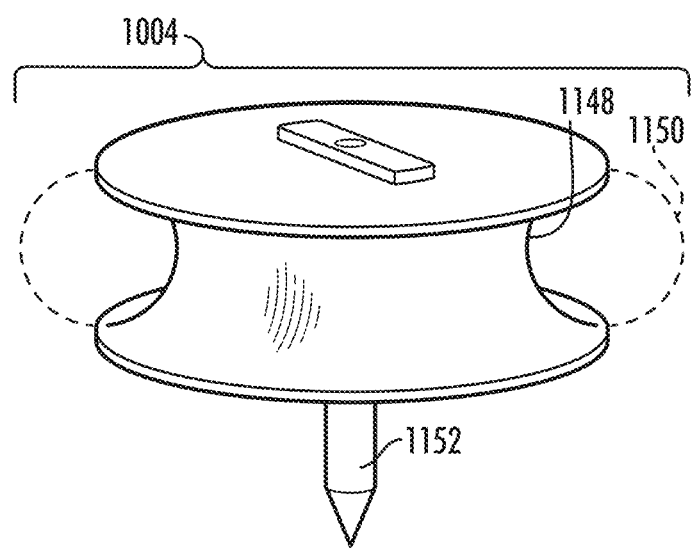
Figure 11A:
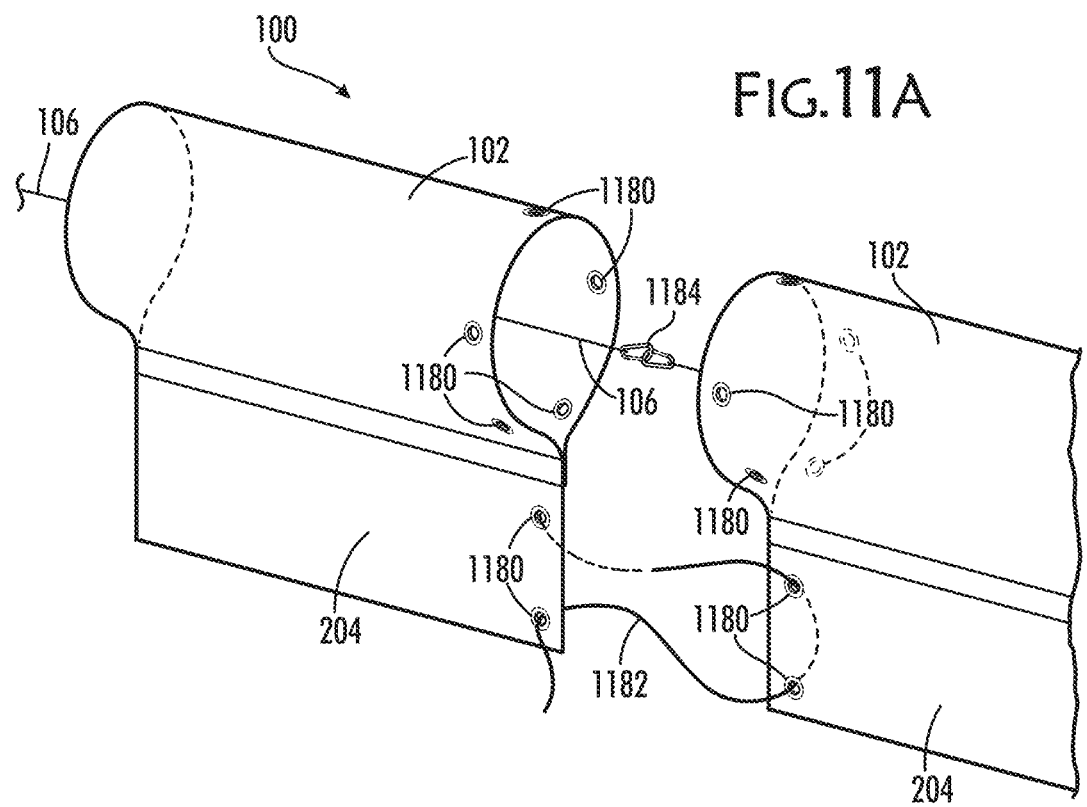
FIGS. 11A and 11B depicts how the erosion control apparatus (100) may be connected to other apparatus if the pathway is long or if some of the filtering member (102) is left from one roll and can be joined to a new roll in the field. As mentioned previously, the filtering member is placed during manufacturing on a roll. During the installation process in the soil or other surface, the tail of the filtering member (204) is placed into the ground. When a roll is near the end of its length, the filtering member may be connected to another roll of material. This may be done using grommets (1180) placed in both ends of the filtering member for both the tail and the looped portions. Using these grommets, wire or rope (1182) may be woven through the grommets to connect one section to another. In this connection, the next roll should always be placed on the outside of the previous roll to help with insertion of the support member. The guide member from one roll may be tied or clamped to the guide member of the new roll (1184) so that the connecting member may continue to be used to pull the support member through the looped portion of the filtering member. Other structures can be utilized to hold the two ends of the rolls together. These include bolts, rivets, buttons and holes, clamps, staples, heat sealing, welding, adhesives, hooks and loops, and even a hinge method where a pin is used to join one part of the hinge from one roll with the other part of the hinge from the second roll. Another embodiment, depicted in FIG. 11B, when one roll runs out is to overlap the end with another end by at least 2 feet (1186) and stake or bury each end in the soil or other surface. The overlapping method precludes the need of other attachment approaches since the two ends are not attached to one another. The function of the filtering member is still preserved, however, since the overlapping portion does not permit water to exit the site without first passing through the filtering member.
Figure 11B:
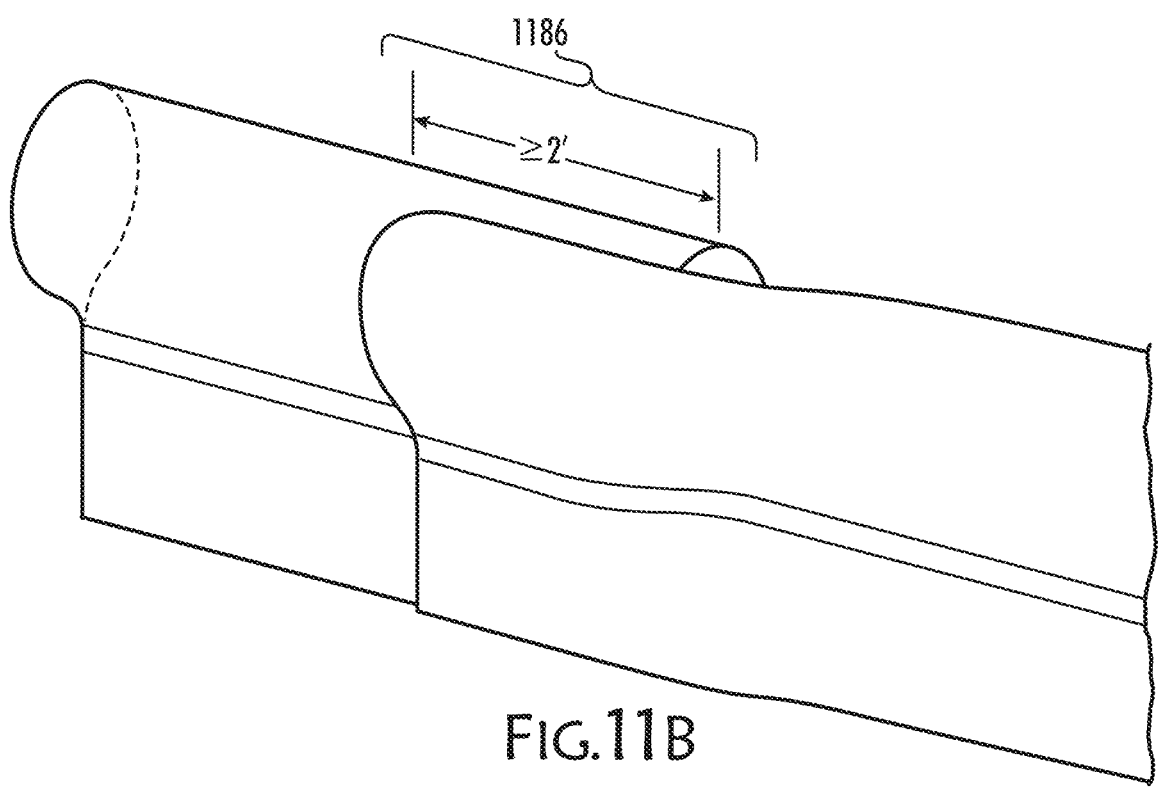
Figure 12:
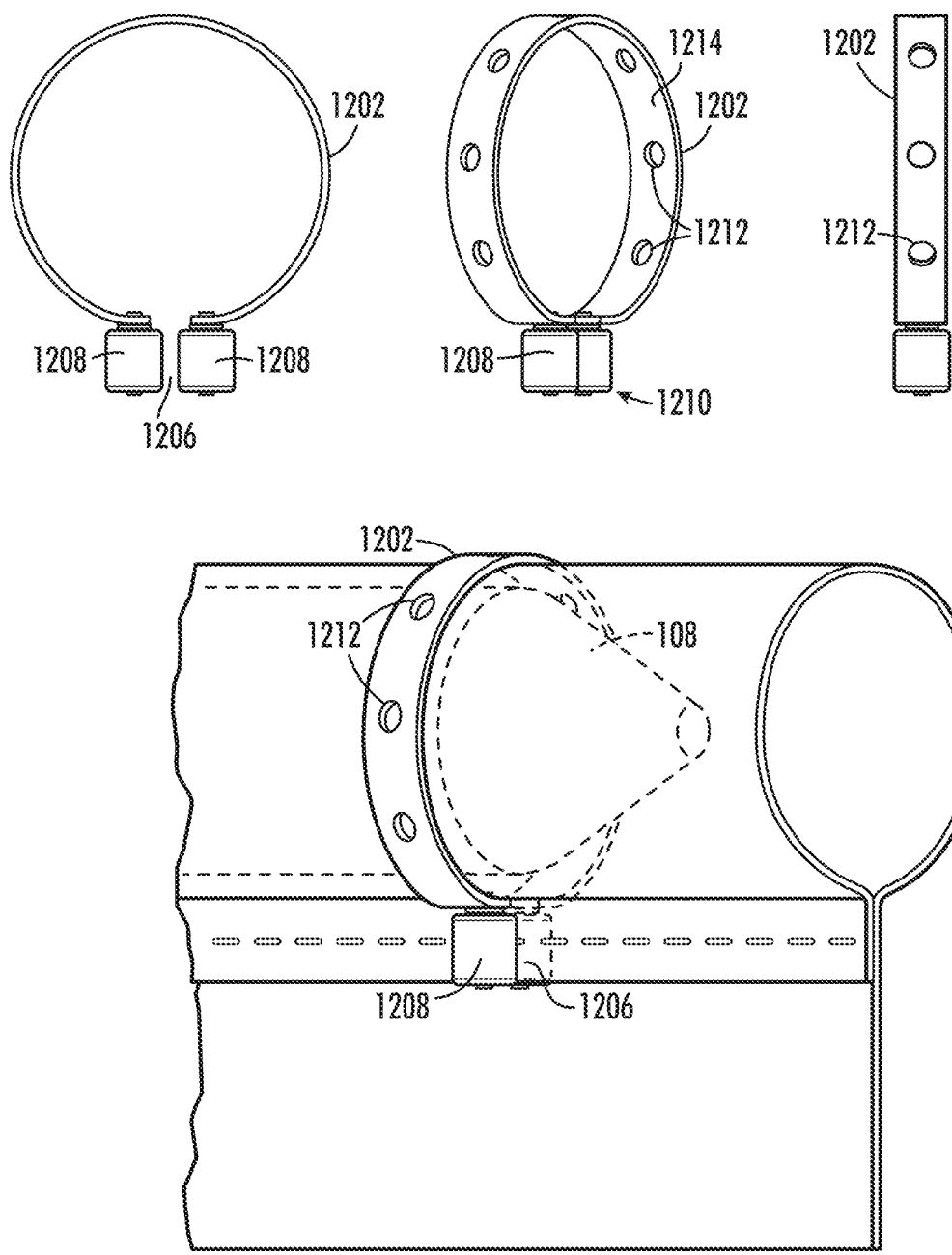
FIG. 12 depicts the external threading member (1202) defined by a collar capable of surrounding the looped portion of the filtering member. The collar may completely surround the looped portion of the filtering member or a small gap may permit the tail portion of the filtering member to protrude from the collar (1206). The collar may contain guide features (1208) such as rotating shapes to help maintain the collar's orientation to the filtering member and to the contents therein. The collar may also possess features (1210) such as wheels in some embodiments to maintain orientation of the collar relative to the soil or surface wherein the erosion control apparatus is installed. The collar may also possess features (1212) which allow it to be attached to the filtering member installation device such as a silt fence plow (220). The collar may contain features for applying forces (1214) to the support member inside the looped portion of the filtering member. The collar may contain features for applying forces to the connecting member (108) inside the looped portion of the filtering member. In one embodiment the forces may be magnetic. The forces may also be mechanical, among other forces.
Figure 13:
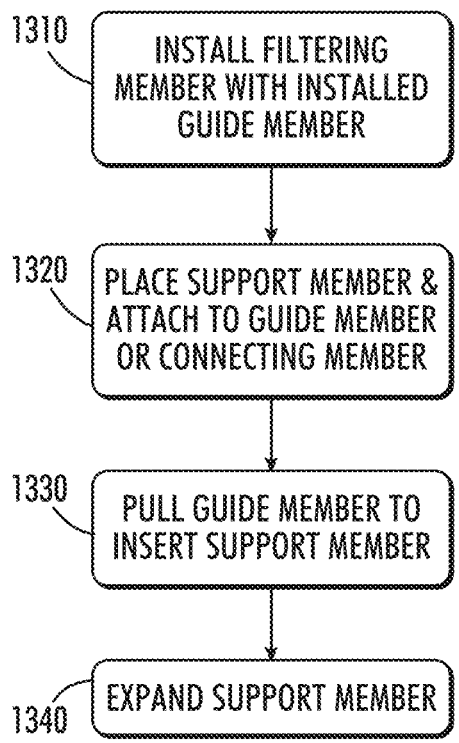
FIG. 13 depicts a flowchart for installing an erosion control device using a guide member to insert the support member within the looped portion of the filtering member. The first step (1310) is to install the filtering member with the guide member installed in the looped portion of the filtering member. The next step (1320) is to place the support member by the first opening of the filtering member and attach the guide member to the support member or the connecting member. The next step (1330) is to pull the guide member through the loop portion of the filtering member to install the support member. The next step (1340) is to expand the support member.
Figure 14:
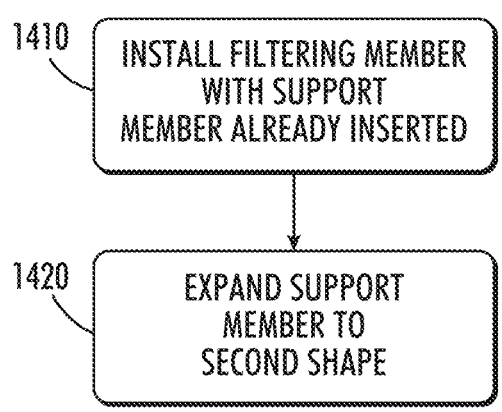
FIG. 14 depicts a flowchart for installing an erosion control device using a preinstalled support member within the looped portion of the filtering member. The first step (1410) is to install the filtering member with the support member already installed in the filtering member. The second step (1420) is to expand the support member.
Figure 15:
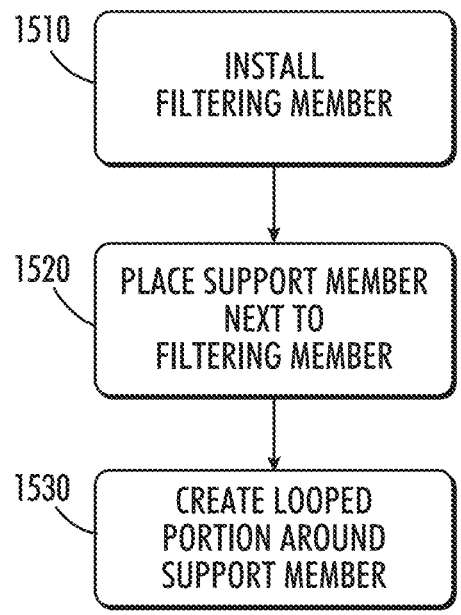
FIG. 15 depicts a flowchart for installing an erosion control device using the filtering member to substantially surround the support member. The first step (1510) is to install the filtering member in the soil or surface. The second step (1520) is to place the support member next to the filtering member. The next step (1530) is to create a loop around the support member.
Figure 16:
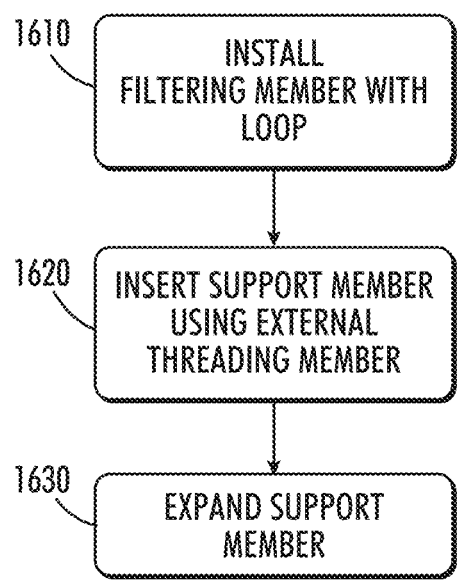
FIG. 16 depicts a flowchart for installing an erosion control device using an external threading member to insert the support member. The first step (1610) is to install the filtering member with looped portion. The next step (1620) is to insert the support member using the external threading member. The next step (1630) is to expand the support member.

In some embodiments as depicted in FIG. 9, a pallet roll apparatus comprising a roll of support member which may be mounted vertically (904) or horizontally (902) on a pallet (906). In some embodiments, the support member may be unrolled and laid out on the ground next to the filtering member prior to insertion depending on the installation method. In some installation embodiments, the filtering member looped portion is formed around the support member (314) and the looped portion seam previously mentioned is formed in the field. In some embodiments as depicted in FIG. 5, the pallet roll apparatus comprising a roll of support member can be placed at the end of the filtering member following the insertion of the filtering member into the soil or other surface. The pallet roll apparatus can hold a support member of either an initial or second shape. A pallet roll apparatus can be selectively rotated to permit payout of the support member during installation at the site. After the support member in its first shape is affixed to the connecting member or the guide member, then the guide member at the other end of the filtering member may be connected to the pallet winch (122).

Tensioning the guide member by hand or with equipment through a pulling motion is one method to insert a support member. The pallet winch apparatus is used to pull the guide member through the filtering member in order to insert the support member. The pallet winch apparatus can be moved because the portable member has features (120) that can be lifted using forks or other lifting features on a skid steer, mini-skid steer, tractor, or other lifting device (502). A portable member (118) of the pallet winch contains the tensioning member (122), stability member (504), and the power member (126). High production teams use the pallet winch since the pallet can be setup at the end of the installed filtering member. On this portable member the winch is powered by the power member via air, hydraulics, pneumatics, or electricity. Stability members anchor the pallet winch to the soil or installation surface. The stability member is connected to the pallet. The stability member may or may not be rigidly connected to the portable member. The guide member is attached to the winch cylinder (122) or a cable attached to the winch and the winch cylinder is rotated to apply tension to the guide member. During the application of tension, care should be given to the speed at which the tension is applied to prevent excessive stress on the plastic sheath of the support member causing the heat seal seams to fail and the first shape of the support member to assume its second shape which is difficult, but not impossible, to pull through the looped portion in the filtering member.

In some embodiments, the speed range for the tensioning member of the pallet winch apparatus attached to the guide member is approximately 6" to 12" inches per second. If the pathway of the filtering member has sharp radii or many turns instead of a straight line pathway, then the pull rate on the guide member can be reduced. If many sharp corners are present in the pathway or friction inside the filtering member is large due to other factors, reducing the length of the filtering member segments, the friction due to insertion can be greatly reduced and the rate of insertion by tensioning the guide member can be increased. The optimal insertion rate is important for efficient installation in order to maximize labor efficiency. When this is done, the ends of the filtering member may be slit and may be covered after installation to ensure the filtering member performs its function or overlapping segments adjoining each other of the filtering member may be configured to ensure the filtering member functions properly. In some embodiments, the overlapping regions of the filtering member may overlap at least 24" inches in length and the tails can be firmly embedded into the soil or captured on a rigid surface as previously discussed.

Once the support member has been fully inserted into the looped portion of the filtering member using the guide member and/or connecting member, the guide member can be disconnected from the support member. At each 8-10 foot segment, the plastic sheath inside the looped portion of the filtering member can be pierced at least one time allowing air to expand inside the plastic sheath so that the support member can assume its second shape. Alternative embodiments of the support member include a container which may be filled with liquid or gas or other contents after insertion into the looped portion of the filtering member. The alternative embodiments of the support member make insertion into the looped portion of the filtering member easier since the first shape of the support member is even smaller than the support member structured with compressed foam and a plastic sheath.

If the support member is compromised, then the container segment may eventually release its contents and the function of the filtering member may be compromised. If the container embodiment is used, care should be given to not overfill the container with air, gas, liquid, or other contents. With heavy traffic, especially vehicle traffic, compressing a full container may cause it to rupture. In some embodiments, the container may be filled to no more than 60% capacity and the filled shape may be approximately 4 to 6 inches in diameter.

After the guide member has been disconnected from the support member or connecting member, the ends of the looped portion of the filtering member may be closed to prevent damage to the support member. Some crews fold the ends of the filtering member over on itself or use a stake or t-post to maintain the fold. Other crews use staples or electrical ties to cinch the opening to prevent the filtering member from opening. The electrical tie is commonly used since these are readily available, low cost, and quick to install. In some embodiments, the filtering member may be tucked into the soil or under lumber or other attaching devices mounted to a rigid surface.

As mentioned previously, the pathway of the filtering member is the location at a site that the erosion control apparatus travels which may or may not be straight and may or may not be located around the perimeter of the site. The pathway may be located on soil or may be located on other surfaces. In a home construction site, for instance, the filtering member (104) is inserted into the soil starting on the side of the property, then the pathway of the filtering member requires a sharp turn at the corner of the property followed by a straight pathway at the front of the pathway and finally followed by a sharp turn to go up the other side of the property (1002). In some embodiments, from the street, the complete pathway of the filtering member when inserted into the soil may appear like a "U" shape with sharp, almost 90 degree, turns at the right and left extremes of the site. In these turns or corners, an erosion control apparatus described herein requires an apparatus for support installation. In some embodiments, once the filtering member is installed, the guide member can be used to insert the support member as previously discussed. Upon application of tension to the guide member at the end of this "U" shaped pathway, then guide member tension may pull the filtering member out of the soil in order to minimize the overall length. In this case, in some embodiments an external pathway maintaining member (1004) may be used to maintain the inside bend at the right and left corners. The apparatus has several embodiments which keep the filtering member attached to the soil or surface and aid in the support member turning the sharp corner.

In some embodiments, an external pathway maintaining member (1004) is used. The external pathway maintaining member prevents the tail portion of the filtering member from being pulled from the soil by counteracting the forces generated when inserting the support member or tensioning the guide member, or applying force to the connecting member within the looped portion of the filtering member. The external pathway maintaining member is held in place using t-posts or tapered bars (1010 or 1122) inserted into the soil on the inside radius. A plate with holes (1006 and 1120) for these t-posts may slide over the t-posts or rigid bars and another plate (1008) can maintain the filtering member radius under tension. In some embodiments, the external pathway maintaining member (1004) may be held in place by an operator or substantial weight while the guide member (106) and the support member (110) of a first shape are inserted through the looped portion of the filtering member (112). In other embodiments, the external pathway maintaining member can use t-posts on both the inside and outside radii of the corner. The t-posts on the outside help secure the external pathway maintaining member.

The external pathway maintaining member has several shapes. In one embodiment, the inside radius is concave vertically (1132) and the external pathway maintaining member bisects the internal radius. In another embodiment, the inside radius is convex vertically (1142 or 1150) using the same minimum radius previously mentioned. In an embodiment, a t-post is mounted in the soil (1146 or 1148) next to the inside radius of the filtering member pathway. A round shape slides over the t-post (1152) and the outside circumference of the round shape touches the filtering member. As the guide member is pulled through the looped portion of the filtering member, the round shape reduces sliding friction caused by the sharp turn of the filtering member pathway.

Patches (602) to the filtering member are sometimes necessary in some embodiments. Depending on the size of slits, tears, or cuts in the filtering member, a patch may be used to ensure that the filtering member functions properly. In some embodiments, the slit or disruption in the filtering member should be removed. In these embodiments, using the overlapping structure previously discussed, the filtering member can be installed and have an overlap between two ends of the filtering member with the filtering member ends being installed adjacent to one another in order to prevent water from flowing between the filtering member ends. In some embodiments, the patch can be larger than the slit or opening. The patch, in some embodiments, can be inserted into the looped portion of the filtering member and have an internal overlap of at least 6 inches on each side of the slit or opening. The support member inside the looped portion of the filtering member will help to hold the patch in place following patch installation. In some embodiments, by using this overlapping patch structure and placing the patch inside the looped portion, the filtering member function is preserved and the patch location may be maintained.

In some embodiments, an easy to install erosion control apparatus comprises a filtering member and defining a looped portion; a guide member positioned within the looped portion of the filtering member; a support member adapted for insertion within the looped portion of the filtering member, and a connecting member which facilitates insertion of the support member into the looped portion of the filtering member. The guide member may be used to pull the connecting member and the support member through the looped portion of the filtering member. An alternative method for pulling the support member (110) through the filtering member (104), is to use an external threading member (1202) placed in close proximity to the filtering member on the outside of the looped portion. The proximity of the external threading member to the filtering member permits the external threading member to forcibly connect to the connecting member within the looped portion of the filtering member. This forcible connection enables the external threading member to insert the connecting member and support member further into the looped portion of the filtering member. In some embodiments, the external threading member is a semi-rigid collar which may have an opening for the tail portion of the filtering member. The external threading member, in some embodiments, may not have an opening for the tail portion of the filtering member. The collar may contain guide features such as rotating shapes (1208) or round surfaces (1210) to help maintain the collar's orientation to the filtering member and to the contents therein. These surfaces or shapes also reduce sliding friction between the filtering member and the external threading member. The external threading member may also possess features to maintain orientation of the external threading member relative to the soil or surface wherein the erosion control apparatus is installed. The external threading member may also possess features (1212) which allow it to be attached to the filtering member installation device such as a silt fence plow (220 & 224). The attachment of the external threading member to the installation equipment permits immediate insertion of the support member simultaneous to the filtering member installation. This eliminates the need for installers to install the device in two steps namely filtering member installation and guide member/ support member insertion. If the support member can be installed with the external threading member while the filtering member is being inserted into the ground even more labor efficiencies are realized. The external threading member may contain features for applying forces (1214) to the support member inside the looped portion of the filtering member through multiple means. The external threading member may contain features for applying mechanical forces to the connecting member inside the looped portion of the filtering member. The forces may also be magnetic. The forces applied by these means external to the looped portion of the filtering member serve to make insertion of the support member more efficient.

Figure 2A:
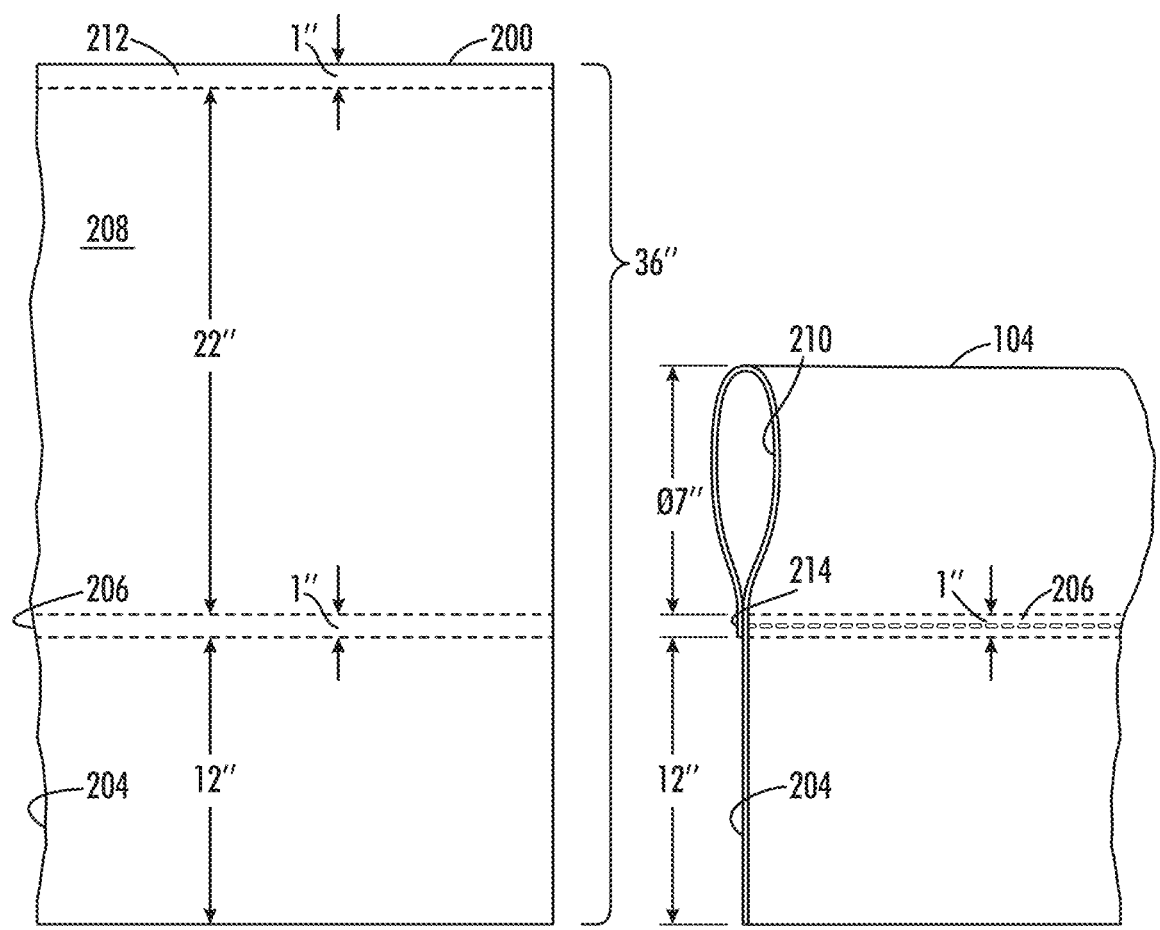
FIGS. 2A-2C show one embodiment of the silt fence filtering member apparatus (200) of this invention. Basic dimensions for a 36 inch wide filtering member (104) made from high strength, black polypropylene show a 12 inch tail (204) with a 1 inch sewn seam section (206). Other sizes and configurations of both the looped and tail portions of the filtering member are used depending on the required need. In this configuration, next to the seam section is a 22 inch portion (208) (used to create an approximately 6-7 inch diameter loop (210) followed by a remaining 1 inch seam section (212) mated and sewn to the aforementioned 1 inch seam (206). A constructed section of the filtering member is also shown in this drawing with the 12 inch tail and 6-7 inch diameter looped portion. Stitch options for the sew seam section include overlook, zig zag, and 3 step zig zag (214). Other sizes for the silt fence material may be used. With the larger width fences, the tail portion may be enlarged by up to 6 inches for the 42 inch width and 12 inches for the 48 inch width. The embodiment illustrated is 36 inches wide as this minimizes silt fence cost and also provides sufficient tail length for either subterranean plowing or mounting to hard surfaces such as asphalt, concrete, or other material. The 36 inch width also provides a large enough loop section (210) for the filtering member. Additional width may also be used to increase the 22 inch portion of the fence and thus expand the looped portion of the filtering member. A 42 inch width increases the diameter of the looped portion to approximately 8 inches and a 48 inch width increases the looped diameter to about 10 inches. Enlarged diameters for the looped portion of the filtering member ease the installation of the guide and support members. A tradeoff must be made to balance the increased silt fence material cost with the reduced labor cost using a larger loop to aid installation. A roll of the filtering member (128) is depicted with the guide member (106) installed in the looped portion of the filtering member (210). A tube (216) is shown that the roll of filtering member is wrapped around.
Figure 2B:
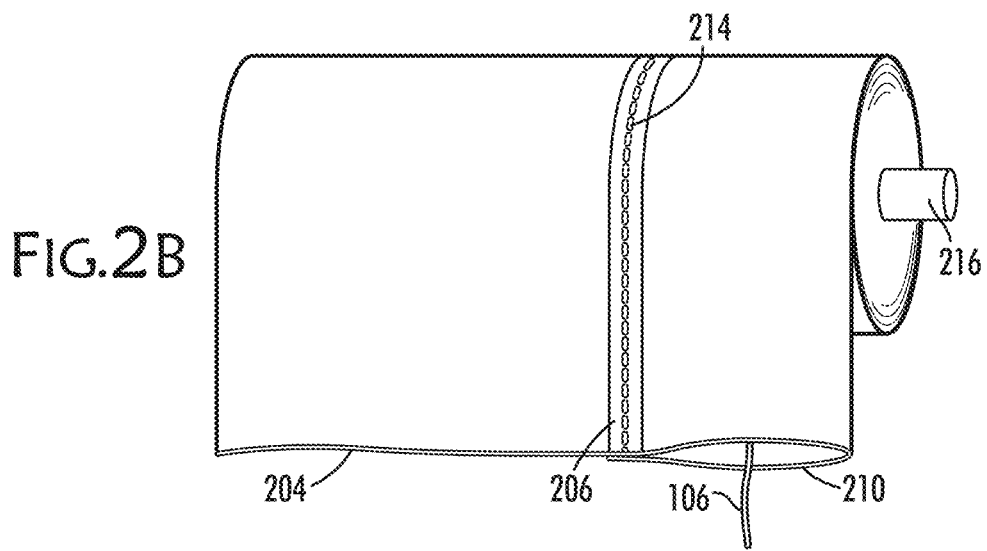
Figure 2C:
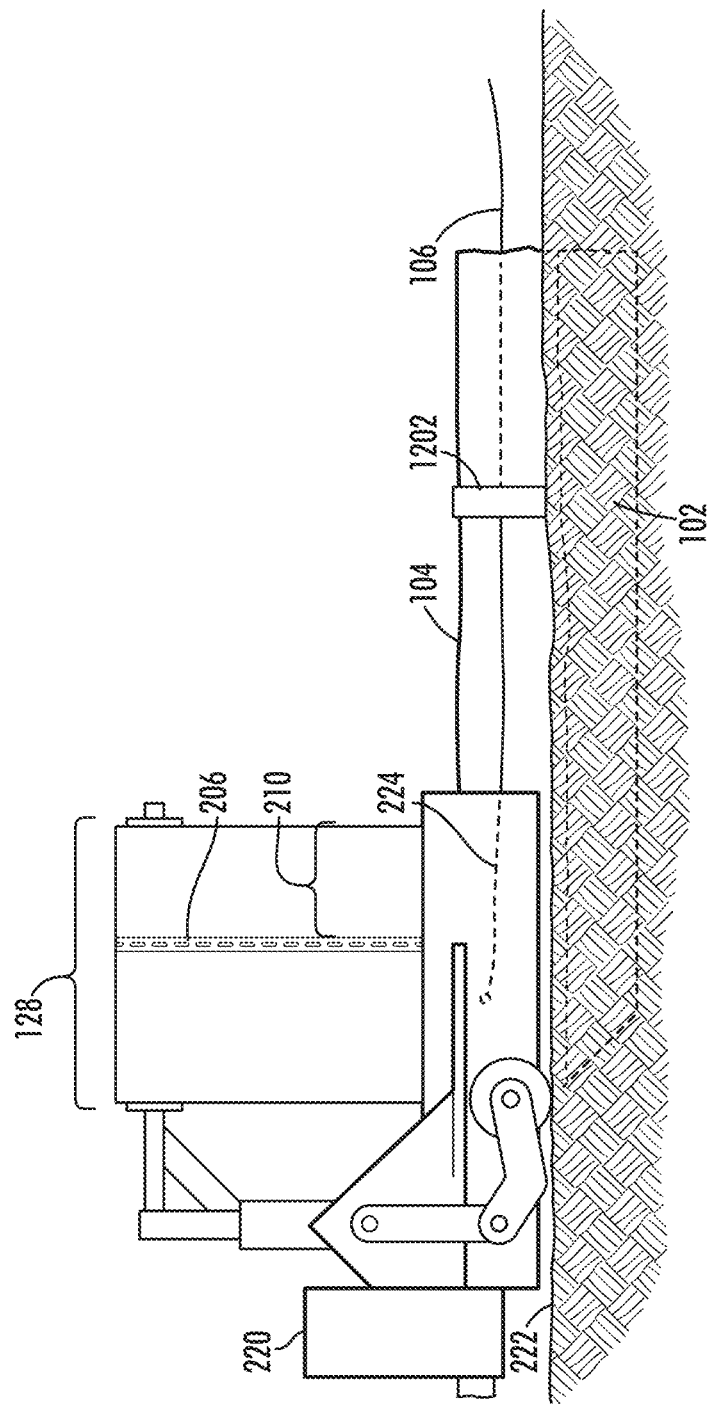
Figure 3A:
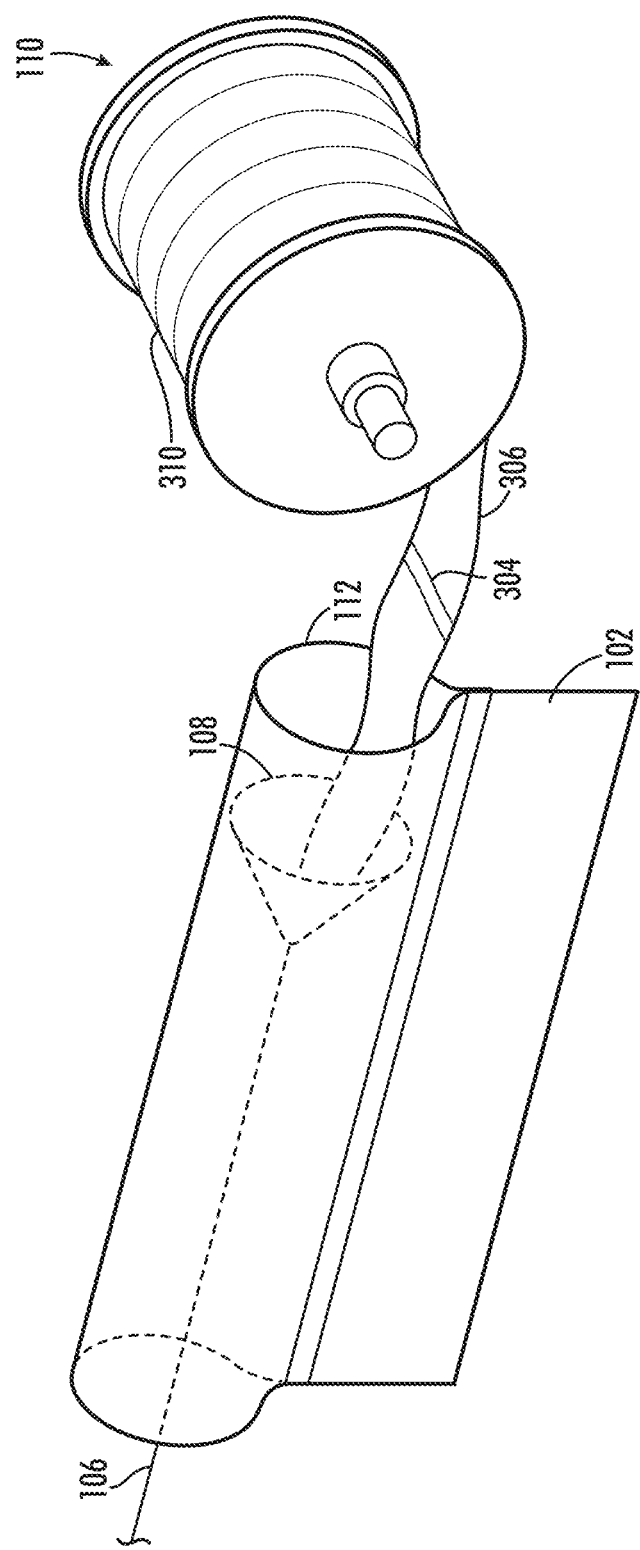
FIGS. 3A and 3B shows different installation methods for the erosion control apparatus.
Figure 3B:
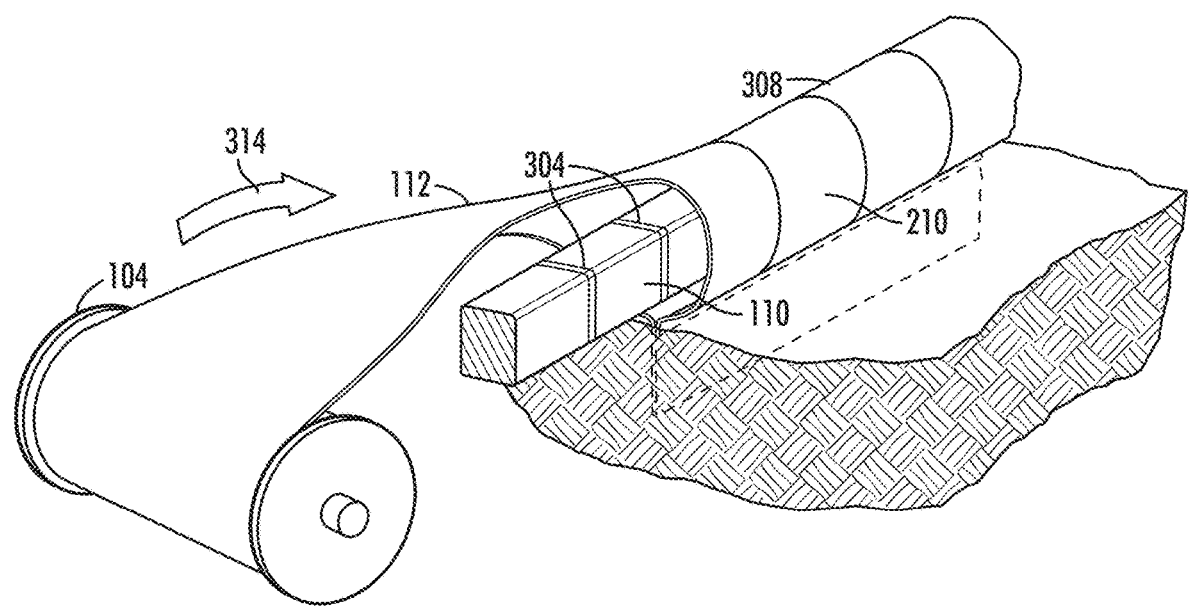
Figure 17A:
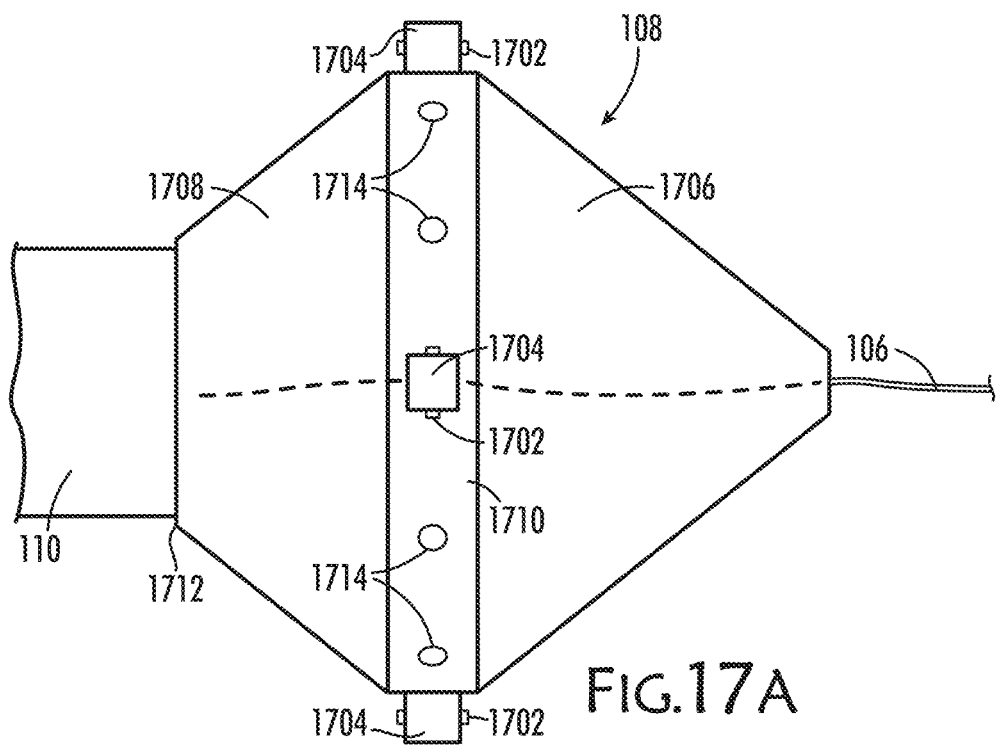
FIG. 17A-17C illustrates one embodiment of the connecting member (108).
Figure 17B:
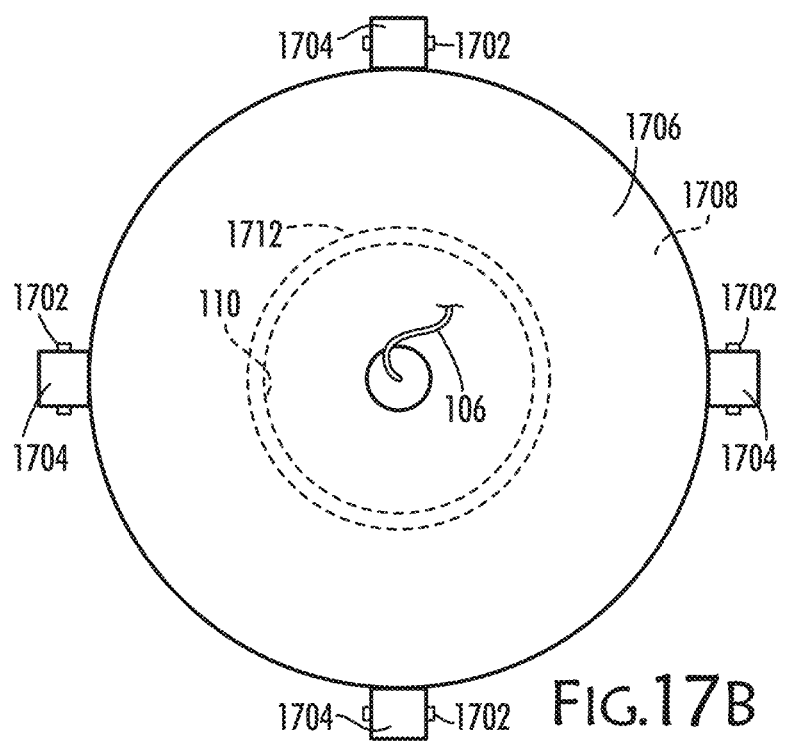
Figure 17C:
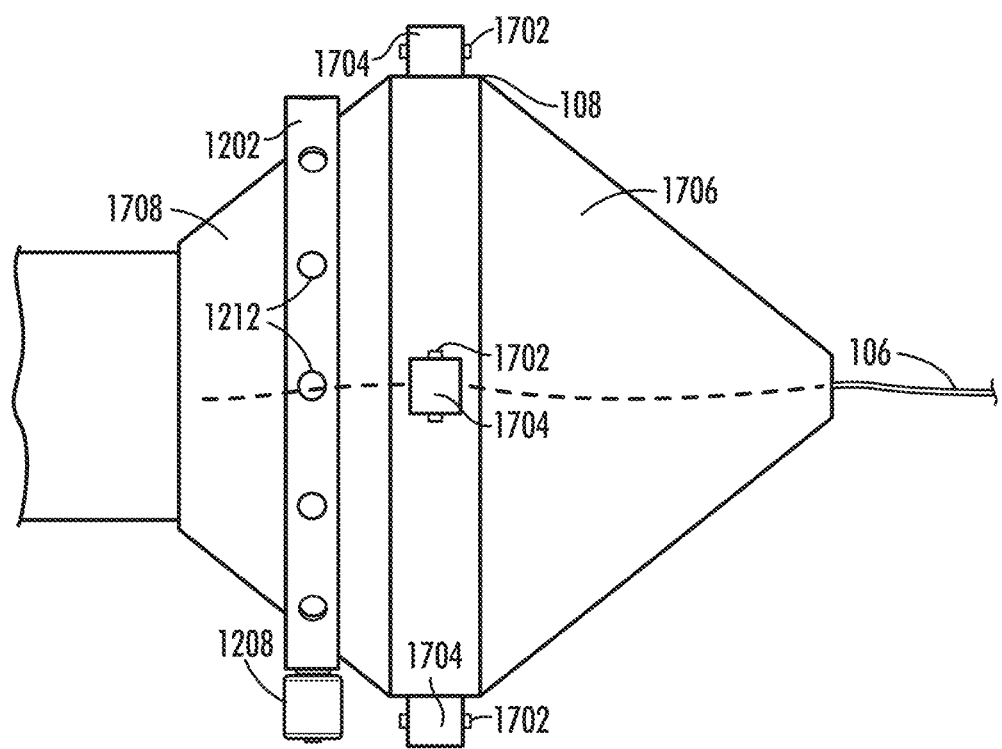

Using a magnet to magnet or magnet to ferrous material connection wherein one part is attaching to the guide member (106) or to the connecting member (108) or directly to the support member inside the looped portion of the filtering member (112) and the other part is placed outside of the looped portion of the filtering member, the guide member (106) or the support member 110) may be pulled through the looped portion thereby eliminating the need for the pallet winch. Another embodiment depicted in FIG. 17C uses the external threading member to squeeze the aft portion of the connecting member through the looped portion of the filtering member. The fore section of the connecting member helps to expand the looped portion of the filtering member. A section between the fore and aft sections of the connecting member may contain features for manipulating the connecting member such as magnetic attachment points or surfaces used to reduce friction inside the looped portion of the filtering member. The external threading member on the outside of the looped portion may contain wheels to run along the surface and maintain the position of the external threading member relative to the looped portion of the filtering member. The structure of the device may completely surround the looped portion of the filtering member as the external threading member is pulled along the filtering member pathway. The primary advantage is that the external threading member may be attached (224) to the filtering member insertion equipment (220) allowing the support member to be immediately installed within the looped portion of the filtering member as depicted in FIG. 2C as previously mentioned.

In some embodiments, an easy to install erosion control apparatus comprises a filtering member and defining a looped portion; a guide member positioned within the looped portion of the filtering member; a support member adapted for insertion within the looped portion of the filtering member, and a connecting member which facilitates insertion of the support member into the looped portion of the filtering member. An alternative embodiment involves embedding the tail of the filtering member as previously discussed into the soil or sandwiching the tail between a hard surface such as asphalt or concrete and lumber or other mechanism. However, the filtering member, in some embodiments, does not include the guide member nor does it include the looped portion of the filtering member.

In this embodiment, the support member is laid alongside the filtering member pathway starting at the beginning and following the pathway of the installed filtering member not possessing a loop. In this embodiment, once the support member, in either its initial or second shape, is laid along the pathway, then the filtering member looped portion is formed around the support member (314). In some embodiments, the edge of the filtering member can be attached using heat sealing, sewing, magnets, rivets, hooks and loops, or other approaches, to itself just above the tail portion of the filtering member thereby creating a loop structure (210). The edge width can be at least a 1 inch swath as discussed previously.

This alternative design eliminates the need for the guide member and pulling the guide member, connecting member, and the support member of a first shape through the filtering member upon installation. This embodiment reduces the difficulty associated with tensioning the support guide. The enclosure also ensures that the support member is protected during crush events or other traffic which tramples the invention in high traffic areas of construction sites.

Although the above description and the attached claims disclose a number of embodiments of the invention, other alternative aspects of the invention are disclosed in the following further embodiments.

Embodiments of an Erosion Control Apparatus

The following embodiments describe various alternative aspects of Erosion Control Apparatus' with a guide member and a support member having a variety of configurations.

Embodiment 1. An erosion control apparatus comprising:
a filtering member and defining a looped portion;
a guide member positioned within the looped portion of the filtering member;
a support member adapted for insertion within the looped portion of the filtering member;
wherein the guide member facilitates insertion of the support member into the looped portion of the filtering member.

Embodiment 2. The erosion control apparatus of embodiment 1 wherein a connecting member is located between the support member and the guide member with attachment features to join the guide member and the support member.

Embodiment 3. The erosion control apparatus of embodiment 1 wherein the filtering member is adapted to permit liquid to transmit through the filtering member while substantially retaining silt and other components from the liquid.

Embodiment 4. The erosion control apparatus of embodiment 3 wherein the filtering member comprises a polyethylene or polypropylene plastic mesh, metal mesh, reticulated open cell foam, non-reticulated open cell foam, or perforated polyethylene or polypropylene plastic sheet.

Embodiment 5. The erosion control apparatus of embodiment 1 wherein the looped portion is defined by a portion of the filtering member being connected to the filtering member.

Embodiment 6. The erosion control apparatus of embodiment 1 wherein the looped portion is defined prior to delivery at the construction site.

Embodiment 7. The erosion control apparatus of embodiment 1 wherein the looped portion is formed at the construction site.

Embodiment 8. The erosion control apparatus of embodiment 1 wherein the looped portion comprises repair material to compensate for any opening in the filtering member.

Embodiment 9. The erosion control apparatus of embodiment 1 wherein the support member defines a first shape during insertion into the looped portion of the filtering member and a second shape following insertion into the looped portion wherein the first shape is smaller than the second shape.

Embodiment 10. The erosion control apparatus of embodiment 9 wherein the second shape of the support member is expanded relative to the first shape.

Embodiment 11. The erosion control apparatus of embodiment 9 wherein the support structure comprises a resilient structure that deforms under load and then resumes the second shape once the load is removed.

Embodiment 12. The erosion control apparatus of embodiment 9 wherein the support member compresses under load and deforms to seal around a load which reduces the flow of unfiltered liquid around the filtering member instead of through the filtering member.

Embodiment 13. The erosion control apparatus of embodiment 9 wherein the support member first shape is a square cross section.

Embodiment 14. The erosion control apparatus of embodiment 9 wherein the support member first shape is a rectangular cross section with a larger dimension oriented vertically.

Embodiment 15. The erosion control apparatus of embodiment 9 wherein the support member first shape is at least 50% smaller than the second shape.

Embodiment 16. The erosion control apparatus of embodiment 9 wherein the support member comprises a heat-sealed plastic sheath, wherein the sheath prevents a liquid, solid, or gas from escaping through the sheath of each segment of the foam material inside the support member sheath.

Embodiment 17. The erosion control apparatus of embodiment 1 wherein the support member comprises a container filled with at least one of liquid, gas, foam, and other resilient structure.

Embodiment 18. The erosion control apparatus of embodiment 1 wherein the support member is a pole and spring device that is compressed in a first shape and expanded in a second shape.

Embodiment 19. The erosion control apparatus of embodiment 1 wherein the guide member is at least as long as the filtering member.

Embodiment 20. The erosion control apparatus of embodiment 1 wherein the guide member is a rope, string, cable, or wire.

Embodiment 21. The erosion control apparatus of embodiment 1 wherein the guide member has a tensile strength of at least 250 pounds-force.

Embodiment 22. The apparatus of embodiment 1 wherein the guide member is composed of a low friction material with smooth features.

Embodiment 23. The apparatus of embodiment 1 wherein the guide member is composed of a plurality of connecting features located between support members.

Embodiment 24. An external pathway maintaining member for an erosion control apparatus comprising a filtering member on an installation surface and defining a bend radius greater than 30 degrees, the external pathway maintaining member comprising: two rigid surfaces located near the erosion control apparatus wherein one surface faces the installed filtering member and the other adjoining surface touches the installation surface; a feature located on the external pathway maintaining member positioned at the inside bend radius of the filtering member pathway structured to resist displacement; and a securing feature adapted for securing the external pathway maintaining member to the installation surface in which the erosion control apparatus is located.

Embodiment 25. The external pathway maintaining member apparatus of embodiment 24 where the external pathway maintaining member uses t-posts to secure the apparatus to the installation surface.

Embodiment 26. The external pathway maintaining member apparatus of embodiment 24 where a rigid bar is used to secure the external pathway maintaining member to the installation surface.

Embodiment 27. The external pathway maintaining member apparatus of embodiment 24 wherein the external pathway maintaining member uses sufficient weight to reduce unintended movement when forces from the erosion control apparatus are exerted on the external pathway maintaining member.

Embodiment 28. The external pathway maintaining member apparatus of embodiment 24 wherein the rigid surface facing the installed filtering member is a vertical wall, convex curve or concave curve.

Embodiment 29. The external pathway maintaining member apparatus of embodiment 24 wherein the rigid surface facing the installed filtering member is at least 12" long and at least 4" high. 30. The external pathway maintaining member apparatus of embodiment 24 wherein the external pathway maintaining member contains features so that bars may be used to locate and secure the external pathway maintaining member to the soil or surface where the erosion control apparatus is being installed.

Embodiment 31. The external pathway maintaining member apparatus of embodiment 24 wherein the rigid surface facing the installed filtering member is a radiused shape facing the inside bend radius of the erosion control apparatus pathway.

Embodiment 32. The external pathway maintaining member apparatus of embodiment 31 wherein the rigid surface facing the installed filtering member structured with a concave, convex or vertical wall to reduce friction as the support member is installed into the looped portion of the filtering member.

Embodiment 33. The external pathway maintaining member apparatus of embodiment 24 wherein the external pathway maintaining member is located on either side of the erosion control apparatus mounting to the soil or surface to the outside of the erosion control apparatus bend radius.

Embodiment 34. A connecting member for an erosion control apparatus located between the support member and the guide member with attachment features to join the guide member and the support member comprising:

a material adapted for insertion into the looped portion of the filtering member;

a leading surface of expanding cross section in a fore portion of the connecting member;

a trailing surface of decreasing cross section in an aft portion of the connecting member;

a portion joining the fore and aft portions containing features for manipulation within the looped portion of the filtering member;

a structure adapted for connection to the support member; and a structure adapted for connection to another member.

Embodiment 35. The connecting member for an erosion control apparatus of embodiment 34, wherein the connecting member leading surface defines a leading surface and the connecting member trailing surface defines a trailing surface with angular features wherein the largest diameters of both surfaces are substantially connected with a ringed portion; the connecting member of expanding cross section within the looped portion of the filtering member;

the trailing surface defines angular features;

wherein the outside of the filtering member compressing the rearward surface and moves the connecting member and an attached support member inside the filtering member to push forward further installing the support member into the looped portion of the filtering member.

Embodiment 36. The connecting member for an erosion control apparatus of embodiment 34 wherein a structure to expand the looped portion of the filtering member as the guide member is displaced inside the loop.

Embodiment 37. The connecting member for an erosion control apparatus of embodiment 34 wherein a connecting member is defined by the intermediary position between the support member and the guide member for moving the support member through the loop.

Embodiment 38. The connecting member for an erosion control apparatus of embodiment 34 wherein a minimum radius limiting structure permits the filtering member to articulate in angular direction in the erosion control pathway and permits the erosion control apparatus to bend around corners;

Embodiment 39. The connecting member for an erosion control apparatus of embodiment 34 wherein a connecting member located circumferentially outside a support member adapted for insertion;

Embodiment 40. The connecting member for an erosion control apparatus of embodiment 34 further comprising the connecting member install device apparatus is located between the guide member and the support member.

Embodiment 41. The connecting member for an erosion control apparatus of embodiment 39, wherein the connecting member is tied or otherwise connected to the support member and to the guide member.

Embodiment 42. The connecting member for an erosion control apparatus of embodiment 34 where the connecting member has an expanding cross section larger than the first shape of the support member it circumferentially surrounds;

Embodiment 43. The connecting member for an erosion control apparatus of embodiment 34 where the connecting member is semi-rigid.

Embodiment 44. The connecting member for an erosion control apparatus of embodiment 34 where the connecting member is lubricious.

Embodiment 45. The connecting member for an erosion control apparatus of embodiment 45 where the lubricious material is polypropylene, polyethylene, teflon, or acetyl plastic.

Embodiment 46. The connecting member for an erosion control apparatus of embodiment 34 where the connecting member is adapted for manipulation external of the filtering member.

Embodiment 47. The connecting member for an erosion control apparatus of embodiment 34 wherein the connecting member is composed of a ferrous or magnetic material and an install device is composed of a magnetic material.

Embodiment 48. The connecting member for an erosion control apparatus of embodiment 34, wherein the connecting member is composed of a magnetic material and an install device is composed of a ferrous material.

Embodiment 49. The connecting member for an erosion control apparatus of embodiment 34 wherein the connecting member may be manipulated external of the looped portion of the filtering member using a smaller orifice external to the looped portion of the filtering member subjecting a compressive force on the looped portion of the filtering member and on the connecting member and support member internal to the looped portion of the filtering member wherein the compressive force applied to the connecting member and the angle of the surface of the connecting member moves the connecting member and support member inside the looped portion of the filtering member.

Embodiment 50. The connecting member for an erosion control apparatus of embodiment 34 wherein the connecting member may be inserted through the looped portion of the erosion control apparatus using a rope or wire to forcibly pull the guide member through the erosion control apparatus.

Embodiment 51. The connecting member for an erosion control apparatus of embodiment 34 wherein the support member may be inserted through the looped portion of the erosion control apparatus using a rope or wire to forcibly pull the support member through the erosion control apparatus.

Embodiment 52. An external threading member for an erosion control apparatus for a filtering member defining a looped portion, a tail portion, and a support member the external threading member comprising:

a collar member adapted for wrapping around the looped portion of the filtering member structured with an opening for the tail portion of the filtering member;

wherein the collar is adapted to be pulled outside the looped portion of the filtering member for applying a force to the support member of the erosion control apparatus.

Embodiment 53. The external threading member for an erosion control apparatus of embodiment 51 wherein the external threading member and the connecting member inside the looped portion of the filtering member are magnetically connected.

Embodiment 54. The external threading member for an erosion control apparatus of embodiment 51 defining a structure where the external threading member connects to the guide member.

Embodiment 55. The external threading member for an erosion control apparatus of embodiment 51 defining a structure where the external threading member connects to the connecting member.

Embodiment 56. The external threading member for an erosion control apparatus of embodiment 51 defining a structure where the external threading member connects to the support member.

Embodiment 57. A pallet winch apparatus for installing an erosion control apparatus with a guide member, the pallet winch comprising:

a tensioning member is releasably connected to the guide member of the erosion control apparatus and possessing a rotatable cylinder;

a stability member wherein the stability member is connected to the tensioning member permitting the tensioning member to forcibly rotate;

a power member wherein the power member forcibly moves the tensioning member; and a portable member wherein the portable member connects stability member, and the power member while possessing features for lifting the pallet winch.

Embodiment 58. The pallet winch apparatus of embodiment 57 wherein the tensioning member is defined by a rotating cylinder connecting to the guide member of the erosion control apparatus.

Embodiment 59. The pallet winch apparatus of embodiment 58 where the tensioning member may be rotated by the power member generating tension using a winch device via electricity, hydraulics, a combustion engine, or pneumatics.

Embodiment 60. The pallet winch apparatus of embodiment 57 where the stability member is comprised of rods with tapered tips rigidly connected to the portable member.

Embodiment 61. The pallet winch apparatus of embodiment 57 where the portable member is defined by a rigid surface containing on said surface the tensioning member, the stability member, and the power member.

Embodiment 62. The pallet winch apparatus of embodiment 61 where the rigid member possesses structures adapted for lifting and transport of the pallet winch apparatus.

Embodiment 63. A pallet roll apparatus for installation of an erosion control apparatus comprising:

a roll of support member of an initial cross section circumferentially located around a rotatable cylinder connected to selectively rigid mounts allowing rotational movement but preventing translational movement within the pallet roll;

cylinder mounts wherein the mounts permit rotatable motion of the cylinder connected to the surface of the pallet roll apparatus and;

the pallet roll apparatus surface connected to mounts possessing features which can be lifted.

Embodiment 64. The pallet roll apparatus of embodiment 63 where the rotating cylinder is oriented horizontally and the cylinder rotates on an axis parallel to the surface of the pallet roll apparatus of the rigid platform.

Embodiment 65. The pallet roll apparatus of embodiment 63 where the rotating cylinder is oriented vertically and the cylinder rotates on an axis perpendicular to the surface of the pallet roll apparatus of the rigid platform.

Embodiment 66. The pallet roll apparatus of embodiment 63 where the rotating cylinder circumferentially holds a support member of a first shape around the cylinder wherein the first shape of the support member has a cross section at least 50% smaller than the second shape of the support member.

Embodiment 67. The pallet roll apparatus of embodiment 63 further comprising a rotatable cylinder locking device that selectively permits cylinder rotation between the rotatable cylinder and the mounts.

Embodiment 68. The pallet roll apparatus of embodiment 63 further comprising interference of the pallet roll of the support member and the axle of the rotating cylinder.

Embodiment 69. An erosion control apparatus comprising:

a filtering member defining a looped portion longer than 12 feet in length;

a support member positioned within the looped portion of the filtering member prior to installation;

wherein the support member with an initial size smaller than a second size of the support member is located within the looped portion of the filtering member.

Embodiment 70. The erosion control apparatus of embodiment 69 wherein the support member comprises a container filled with at least one of liquid, gas, foam, and other resilient structure.

Embodiment 71. The erosion control apparatus of embodiment 69 wherein the support member of a first shape is pierceable in order for the support member to define the second shape.

Embodiment 72. The erosion control apparatus of embodiment 69 wherein the support member of a first shape is filled in order for the support member to define the second shape.

Embodiments of an Erosion Control Installation Method Using a Guide Member

The following embodiments describe various alternative aspects of Erosion Control Installation Method using a guide member following a filtering member installation in the field.

Embodiment 1: A method of installing an erosion control apparatus wherein a filtering member defines a looped portion the method comprising:

installing a filtering member on a surface over which water is likely to flow to prevent water from flowing beneath filtering member on said surface;

defining the filtering member pathway as a pathway for an installed surface where erosion is to be controlled;

pulling a guide member connected to a support member to insert the support member into the looped portion of the filtering member; and changing a shape of the support member from a first shape into a second shape wherein second shape is larger than the first shape.

Embodiment 2. The method of embodiment 1 further comprising securing the support member to the previously installed guide member in the erosion control apparatus allows the support member to be installed into the looped portion of the filtering member.

Embodiment 3. The method of embodiment 2 wherein securing the connecting member to the previously installed guide member in the erosion control apparatus allows the support member to be installed into the looped portion of the filtering member.

Embodiment 4. The method of embodiment 1 wherein changing the support member shape comprises expanding the support member once the support member is substantially within the looped portion.

Embodiment 5. The method of embodiment 1 further comprising attaching the guide member to the support member using a connecting member which permits pulling of the guide member, support member, and connecting member through the looped portion of the filtering member.

Embodiment 6. The method of embodiment 4 wherein piercing a sheath of the support member of a first shape enables expansion of the support member from the first shape to the second shape.

Embodiment 7. The method of embodiment 4 wherein filling the support member of a first shape enables expansion of the support member to the second shape.

Embodiment 8. The method of embodiment 1 wherein placing a support member at one end of the erosion control apparatus permits the support member to be more easily inserted.

Embodiment 9. The method of embodiment 1 wherein applying force on the support member through the erosion control apparatus using an external threading member for an erosion control apparatus facilitates installation of the support member into the looped portion of the filtering member.

Embodiment 10. The method of embodiment 1 wherein connecting the guide member inside the looped portion of the filtering member to an external threading member by magnetic connection aids in support member insertion.

Embodiment 11. The method of embodiment 8 wherein compressing the connecting member attached to the support member by an external threading member aids in support member insertion Embodiment 12. The method of embodiment 1 wherein using an external pathway maintaining member ensures the securing of the filtering member to the surface during installation.

Embodiment 13. The method of embodiment 1 further comprising protecting by covering devices any portions of the support member exposed by having holes larger than 20 US Sieve.

Embodiment 14. The method of embodiment 1 wherein fastening the ends of the erosion control apparatus permits the erosion control apparatus to remain in the desired location.

Embodiments of an Erosion Control Installation Method with Preinstalled Support Member The following embodiments describe various alternative aspects of Erosion Control Installation Method using a preinstalled support member:

Embodiment 1. A method of installing an erosion control apparatus comprising a filtering member that defines a looped portion and a tail portion the method comprising: installing the filtering member on a surface over which water is likely to flow, preventing water from flowing beneath filtering member on said surface;

defining a filtering member pathway as a pathway for the surface where erosion is to be controlled wherein a support member is provided in the looped portion of the filtering member; and changing the support member first shape into a second shape.

Embodiment 2. The method of embodiment 1 wherein installing the filtering member comprises securing the filtering member to the soil or other surface.

Embodiment 3. The method of embodiment 1 further comprising expanding the support member enables changing the support member first shape into a second shape.

Embodiment 4. The method of embodiment 1 wherein cutting or piercing the sheath of the support member of the first shape enables expansion of the support member from the first shape to the second shape.

Embodiment 5. The method of embodiment 1 wherein filling the support member of the first shape enables changing the support member into the second shape.

Embodiment 6. The method of embodiment 1 where fastening the ends of the erosion control apparatus permits the erosion control device to remain in the desired location.

Embodiments: Erosion Control Installation Method Using a Filtering Member Covering Around a Support Member in the Field The following embodiments describe various alternative aspects of Erosion Control Installation Method using a filtering member covering around a support member in the field.

Embodiment 1: A method of installing an erosion control apparatus wherein a filtering member defines a tail portion comprising:

installing the filtering member on an installed surface over which water is likely to flow, preventing water from flowing beneath the filtering member on said surface;

defining a filtering member pathway as a pathway for the surface where erosion is to be controlled;

placing the support member positioned next to the filtering member pathway on said surface; and surrounding the support member substantially.

Embodiment 2. The method of embodiment 1 further comprising securing the looped portion of the filtering member substantially surrounding the support member with the looped portion of the filtering member.

Embodiment 3. The method of embodiment 1 wherein substantially covering the support member with the filtering member so that the filtering member may be attached to itself or to the support member.

Embodiment 4. The method of embodiment 2 wherein attaching use heat to adhere the filtering member to itself.

Embodiment 5. The method of embodiment 2 where attaching use a fastener such as rivets, hooks and loops, stitches, buttons, stables, clips, or magnets to connect the filtering member to itself.

Embodiment 6. The method of embodiment 2 wherein attaching use heat to adhere the filtering member to the support member.

Embodiment 7. The method of embodiment 2 where attaching use a fastener such as rivets, hooks and loops, stitches, buttons, adhesives, staples, clips, or magnets to connect the filtering member to the support member.

Embodiment 8. The method of embodiment 2 where attaching use a fastener such as rivets, hooks and loops, stitches, buttons, adhesives, staples, clips, or magnets to connect the filtering member to itself.

Embodiment 9. The method of embodiment 1 where attaching the filtering member to itself creates a looped portion of the filtering member.

Embodiment 10. The method of embodiment 1 where fastening the erosion control apparatus permits the erosion control device to remain in the desired location.

Embodiments: Erosion Control Installation Method with External Threading Member

The following embodiments describe various alternative aspects of Erosion Control Installation Method using an External Threading Member.

Embodiment 1: A method of installing an erosion control apparatus wherein a filtering member defines a looped portion and a tail portion comprising:

installing the filtering member on the surface over which water is likely to flow, preventing water from flowing beneath filtering member on said surface;

defining the filtering member pathway as a pathway for the surface where erosion is to be controlled;

connecting an external threading member positioned outside the looped portion of the filtering member to the support member portion inside the looped portion of the filtering member;

moving the external threading member to insert the support member substantially into the looped portion of the filtering member; and changing the support member from a first shape into the second shape.

Embodiment 2. The method of embodiment 1 where securing the support member to the connecting member in the erosion control apparatus allows the support member to be substantially inserted into the looped portion of the filtering member.

Embodiment 3. The method of embodiment 1 further comprising expanding the support member once the support member is substantially within the looped portion.

Embodiment 4. The method of embodiment 1 wherein installing the filtering member comprises securing or inserting the filtering member to the soil or other surface.

Embodiment 5. The method of embodiment 1 where placing the support member at one end of the erosion control apparatus permits the support member to be more easily inserted.

Embodiment 6. The method of embodiment 1 wherein connecting the support member to an external threading member by magnetic attachment aids in support member insertion.

Embodiment 7. The method of embodiment 1 wherein compressing the connecting member attached to the support member with the external threading member aids in support member insertion.

Embodiment 8. The method of embodiment 1 wherein cutting or piercing the sheath of the support member having a first shape enables expansion of the support member from the first shape to the second shape.

Embodiment 9. The method of embodiment 1 wherein filling the support member having the first shape enables expansion to the second shape.

Embodiment 10. The method of embodiment 1 where fastening the erosion control apparatus permits the erosion control device to remain in the desired location.

Embodiment 11. The method of embodiment 1 further comprising protecting by covering devices any portions of the support member exposed by having holes larger than 20 US Sieve.

The invention claimed is:

1. An erosion control apparatus comprising:
   a filtering member defining a looped portion;
   a guide member positioned within the looped portion of the filtering member; and
   a support member insertable in the looped portion of the filtering member;
   wherein the guide member facilitates insertion of the support member into the looped portion of the filtering member; and
   wherein the support member comprises:
   an inner tube having a centrally extending receiving space; and
   an outer layer surrounding the inner tube.

2. The erosion control apparatus of claim 1 further comprising a connecting member positioned between the support member and the guide member, the connecting member comprising attachment features connectable to the support member and the guide member.

3. The erosion control apparatus of claim 1, wherein the filtering member is configured to permit liquid to transmit through the filtering member while substantially retaining silt and other components from the liquid.

4. The erosion control apparatus of claim 3, wherein the filtering member comprises a polyethylene or polypropylene mesh, a metal mesh, a reticulated open cell foam, a non-reticulated open cell foam, or perforated polyethylene or polypropylene plastic sheet.

5. The erosion control apparatus of claim 1, wherein the looped portion is defined by a first portion of the filtering member connected to a second portion of the filtering member.

6. The erosion control apparatus of claim 1, wherein the support member comprises:
   a first shape prior to insertion into the looped portion of the filtering member; and
   a second shape following insertion into the looped portion,
   wherein the first shape has a first cross-sectional diameter that is smaller than a second cross-sectional diameter of the second shape.

7. The erosion control apparatus of claim 6, wherein the second cross-sectional diameter of the support member is expanded relative to the first cross-sectional diameter.

8. The erosion control apparatus of claim 6, wherein the support structure resiliently deforms under load and then resumes the second shape once the load is removed.

9. The erosion control apparatus of claim 1, wherein the centrally extending receiving space is filled with at least one of a liquid or a gas.

10. The erosion control apparatus of claim 1, wherein the inner tube is impermeable to a liquid or a gas present in the centrally extending receiving space.

11. The erosion control apparatus of claim 1, wherein the support member is a mill tube.

12. The erosion control apparatus of claim 1, wherein the guide member is at least as long as the filtering member.

13. The erosion control apparatus of claim 1, wherein the guide member is a rope, string, cable, or wire.

14. A method of installing an erosion control apparatus comprising:
    installing a filtering member on a surface over which water is likely to flow, the filtering member defining a looped portion;
    pulling a guide member connected to a support member to insert the support member into the looped portion of the filtering member;
    wherein the support member comprises:
    an inner tube having a centrally extending receiving space; and
    an outer layer surrounding the inner tube, and
    changing a shape of the support member from a first shape into a second shape, the second shape being larger than the first shape.

15. The method of claim 14, further comprising:
    securing the support member to a previously installed guide member in the erosion control apparatus; and
    installing the support member into the looped portion of the filtering member.

16. The method of claim 14, wherein changing the support member shape comprises expanding the support member when the support member is substantially positioned within the looped portion.

17. The method of claim 15, wherein the guide member is connected to the support member by a connecting member, and the connecting member expands the looped portion of the filtering member during insertion of the support member into the looped portion.

18. The method of claim 14, further comprising attaching the guide member to the support member with a connecting member which permits pulling of the guide member, support member, and connecting member through the looped portion of the filtering member.

\* \* \* \* \*